(12) United States Patent
Gray

(10) Patent No.: US 11,014,529 B2
(45) Date of Patent: May 25, 2021

(54) SEAT BELT RETRACTOR

(71) Applicant: Joyson Safety Systems Acquisition LLC, Auburn Hills, MI (US)

(72) Inventor: Mark Gray, Macomb, MI (US)

(73) Assignee: JOYSON SAFETY SYSTEMS ACQUISITION LLC, Auburn Hills, MI (US)

(*) Notice: Subject to any disclaimer, the term of this patent is extended or adjusted under 35 U.S.C. 154(b) by 77 days.

(21) Appl. No.: 16/399,723

(22) Filed: Apr. 30, 2019

(65) Prior Publication Data

US 2020/0346614 A1 Nov. 5, 2020

(51) Int. Cl.
*B60R 22/28* (2006.01)
*B60R 22/46* (2006.01)

(52) U.S. Cl.
CPC .......... *B60R 22/28* (2013.01); *B60R 22/4633* (2013.01); *B60R 2022/287* (2013.01)

(58) Field of Classification Search
CPC ............... B60R 22/38; B60R 22/4633; B60R 2022/287
See application file for complete search history.

(56) References Cited

U.S. PATENT DOCUMENTS

| | | |
|---|---|---|
| 6,186,432 B1 | 2/2001 | Koning |
| 6,416,008 B1 | 7/2002 | Fujii |
| 6,616,081 B1 | 9/2003 | Clute et al. |
| 7,273,191 B2 | 9/2007 | Clute et al. |
| 7,354,014 B2 * | 4/2008 | Hiramatsu .............. B60R 22/28 242/374 |
| 7,410,113 B2 | 8/2008 | Keller et al. |
| 7,946,519 B2 | 5/2011 | Gray |
| 7,954,854 B2 | 6/2011 | Keller et al. |
| 8,123,154 B2 | 2/2012 | Singer |
| 8,128,016 B2 | 3/2012 | Choi et al. |
| 8,220,735 B2 | 7/2012 | Wang et al. |
| 8,286,903 B2 | 10/2012 | Ogawa et al. |
| 8,646,717 B2 | 2/2014 | Choi et al. |
| 8,740,125 B2 | 6/2014 | Ogawa et al. |
| 8,955,784 B2 | 2/2015 | Axblom |
| 9,327,681 B2 | 5/2016 | Singer et al. |
| 9,527,476 B2 | 12/2016 | Wigstrom et al. |
| 2006/0273210 A1 | 12/2006 | Clute et al. |

(Continued)

FOREIGN PATENT DOCUMENTS

| | | |
|---|---|---|
| WO | 2006/044953 A1 | 4/2006 |
| WO | 2006/045132 A1 | 4/2009 |
| WO | 2010/139434 A1 | 12/2010 |

*Primary Examiner* — Sang K Kim
(74) *Attorney, Agent, or Firm* — Gordon Rees Scully Mansukhani, LLP

(57) ABSTRACT

A seatbelt retractor for a seat belt device in a vehicle. The retractor includes a frame and a spool configured to be fixed to one end of a seat belt webbing so that the webbing may be wound around the spool. The spool is rotatably mounted at both ends to the frame and configured to rotate in a webbing extraction direction and a webbing retraction direction. The retractor includes a staged torsion bar positioned end to end in the spool along an axis of rotation of the spool. The retractor also includes a shift assembly to shift between the stages of the staged torsion bar. The shift assembly includes a shift link locked by a shift collar and a shift ring meshed in a shift plate.

17 Claims, 26 Drawing Sheets

(56) References Cited

U.S. PATENT DOCUMENTS

| | | | |
|---|---|---|---|
| 2007/0075173 A1* | 4/2007 | Boelstler | B60R 22/3413 242/379 |
| 2008/0061180 A1* | 3/2008 | Webber | B60R 22/3413 242/379.1 |
| 2011/0121120 A1* | 5/2011 | Ogawa | B60R 22/4676 242/379.1 |
| 2018/0281745 A1 | 10/2018 | Gray | |

* cited by examiner

SEAT BELT RETRACTOR

The present disclosure relates generally to the field of seat belt retractors for spooling seat belt (webbings) for restraining an occupant of a seat system of vehicles and the like. More specifically, this disclosure relates to a retractor having energy absorbing systems.

As described further herein, the retractor described and shown in the figures of the present application provides for torsion bar(s) staged load paths for energy absorption with the ability to selectively change the amount of energy absorbed by shifting the loads through stages of the torsion bar(s).

A seatbelt device for use within a vehicle provides safety to an occupant by restraining the movement of the occupant during a sudden acceleration, typically resulting from a dynamic impact event of the vehicle. A typical seatbelt device includes a webbing or belt, a buckle, a tongue member to engage the buckle, a retractor, and an anchor member. Retractors include a spool and through the use of a force, often generated by a spring, wind the webbing around the spool. During a dynamic impact event of the vehicle, the retractor locks the webbing from extracting or unwinding, which restricts movement of the occupant.

A retractor may include a pretensioner and a locking mechanism. The pretensioner includes a pyrotechnic charge that rapidly generates gas during a vehicle dynamic event to create pressure to move a piston that may drive a rack, ball bearings, or any other member that may be coupled to a pinion gear through a teeth mesh. The pinion may be coupled directly or indirectly, through a member or hub, to a torsion shaft coupled to the spool, whereby rotation of the pinion transmits torque through the torsion shaft into the spool, creating torque to retract the webbing. This pretension applied to the seatbelt removes the slack between the webbing and the occupant, therefore reducing the movement that the occupant may undergo during the dynamic impact event. The pretensioner may be deployed when sensors on the vehicle detect an impact event and are typically designed to deploy at high speed impacts.

To improve performance, engineers developed load limiting systems for retractors. Load limiting systems typically employ the use of a torsion bar coupled between the webbing spool and the inertial locking device which provides controlled torsional deflection in response to belt webbing loads. The presence of the torsion bar will "soften" the restraint characteristics of the retractor. The torsion bar is designed to deform torsionally when subjected to a predetermined torque to absorb energy during loading, imparted by the mass of an occupant during acceleration of the vehicle, to reduce the restraint force exerted on the occupant during the dynamic impact event, thereby providing improved safety to the occupant.

A retractor may include one or more torsion bars. Certain retractors include two torsion bars to allow for load shifting. A single unitary torsion bar can also be manufactured to provide for load shifting. The load shifting allows the retractor to tailor the forces experienced by the occupant in the event of a crash. Too high of a dampening from the torsion bar may injure the occupant, while too low of a dampening might not be sufficient to prevent injury of the occupant from displacement relative to the vehicle. The retractor can include a shift assembly to provide for a shifting mechanism for the torsion bar.

Accordingly, an object of the present disclosure is to provide a cost effective, space efficient, and relatively straightforward operating retractor that provides for load shifting in the torsion bar. An exemplary torsion bar may have a high load stage and a low load stage. At a designated time determined, for example, by occupant size, crash severity, etc., the retractor shifts from a high load stage (to dampen high acceleration) to a low load (for lower end forces) for optimal resistance performance without injuring the occupant. Therefore, the retractor may be able to tailor the force on the occupant by tailoring the retractor's load bearing capabilities as desired.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

Figure 1:
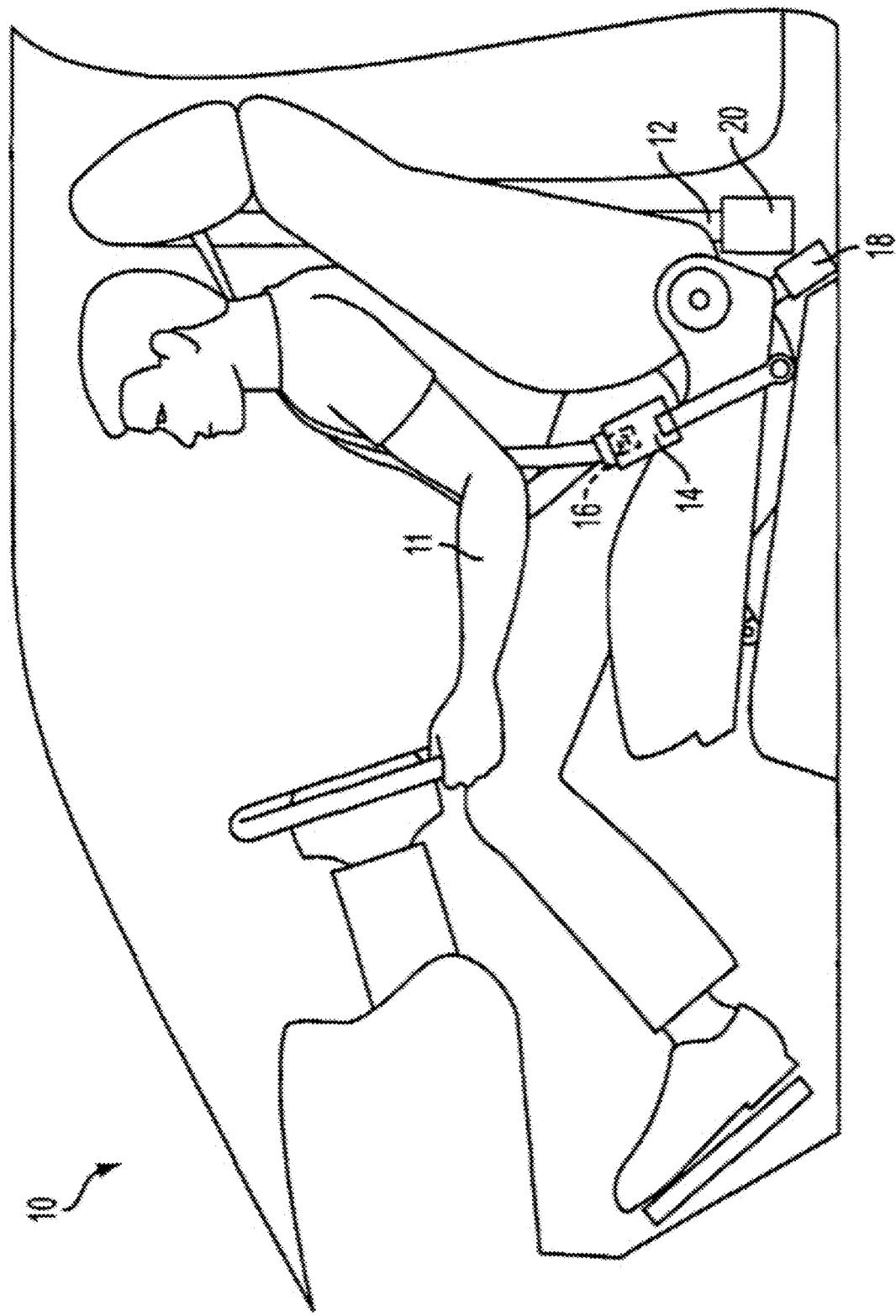
FIG. 1 is a side view of a vehicle showing a seat belt system including a retractor according to an exemplary embodiment.

According to one embodiment of the disclosure, the retractor comprises a staged torsion bar to transfer or absorb torque. The torsion bar is positioned end to end along the spool of the retractor. The staged torsion bar can be used in multiple ways to achieve optimal forces experienced by the occupant for maximum safety. For example, during a high acceleration event (i.e. a high speed crash) a pretensioner may be activated via a micro gas generator (MGG) and retract the webbing of the seat belt system to remove clearance between the webbing and the occupant to mitigate movement of the occupant to improve safety. The staged torsion bar is subjected to a torque in the webbing extraction direction resulting from the force of the occupant being decelerated into the webbing. The staged torsion bar absorbs this torque, from the occupant, and deforms elastically and plastically to manage the energy from the occupant and to mitigate the resultant force being transmitted back into the occupant. This mitigation of the force on the occupant through the torsion bars improves safety. In the case of a single stage torsion bar, the occupant experiences only one dampening profile because the entire length of the torsion bar is subject to twisting. This dampening profile may not be optimal depending on the occupant size or severity of the crash. The dampening profile can be refined by adding an additional stage to the torsion bar. The portion of the torsion bar subject to twisting may be selected in order to provide for different stages. The material properties of the torsion bar and/or the diameter of the torsion bar may be selected in order to determine the load absorption characteristics of each stage of the torsion bar. The stages allow refinement of forces experienced by the occupant through the use a shift assembly for maximum occupant safety.

The shift assembly may comprise of a load nut, a shift link, a shift collar, a shift ring, a shift plate, and a pyrotechnic device such as an MGG. The load nut is engaged to the staged torsion bar via a spline engagement. When the load nut is engaged, the twisting length of the torsion bar is reduced. The outer spline of the staged torsion bar engages the spline hub of the load nut. The load nut is also engaged to the spool via teeth and slots. The spool may comprise teeth that engage with slots located externally on the surface of the load nut. The slots may include a ramp that allows the load nut to be in a self-release configuration to the spool. The load nut is prevented from self-releasing by the shift link. The shift link engages the load nut onto the spool and prevents the load nut from displacing from the spool. The shift link is also in a self-release configuration to the spool. The shift link is engaged to the spool via sliding engagement. A chamfered surface of the shift link interacts with a chamfered surface of the spool to enable the self-release configuration of the shifting link to the spool. The shift link is locked to the spool by a shift collar. The shifting collar surrounds the shift link to prevent the shift link to slide radially outward from the spool. This allows the shifting collar to selectively engage the shift link to the spool. The shift collar is actuated via the shift ring, shift plate, and the shift pyrotechnic device such as an MGG. During activation of the MGG, a piston is displaced and pushes an impact tab of the shift ring. The impact tab is disposed such that a force applied on the impact tab imparts a rotation of the shift ring. The impact tab is located radially outward of the main body of the shift ring, and may be located on a shift ring stem of the shift ring which projects radially outward from the main body of the shift ring.

The shift assembly allows refinement of the dampening profile of the retractor. In an exemplary event, the shift assembly may not be activated because the dampening profile of the unreleased stage of the staged torsion bar is sufficient for the event. In another exemplary event, the shift assembly may hold the unreleased stage of the staged torsion bar and shifts to the release stage of the staged torsion bar at a predetermined time. In another exemplary event, the shift assembly may immediately shift to the release stage of the staged torsion bar. The exemplary event can be any acceleration event where the occupant safety requires the dampening of the staged torsion bar.

Referring to FIG. 1, a seat belt system 10 is shown according to an exemplary embodiment. The seat belt system 10 is employed within a vehicle to help restrain the movement of an occupant 11 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or a belt 12, a buckle 14, a tongue member 16 to engage the buckle 14, an anchor member 18, and a retractor 20. During a dynamic impact event of the vehicle, the retractor 20 locks the webbing from extracting or unwinding, which restricts movement of the occupant. The seat belt system 10 includes one or more sensors (not shown) configured to detect a sudden acceleration of the vehicle. The sensor(s) is configured to send a signal to a controller (not shown) for the retractor 20 to activate the retractor 20 as appropriate depending on whether the sensor detects a low or high acceleration event.

Figure 2:
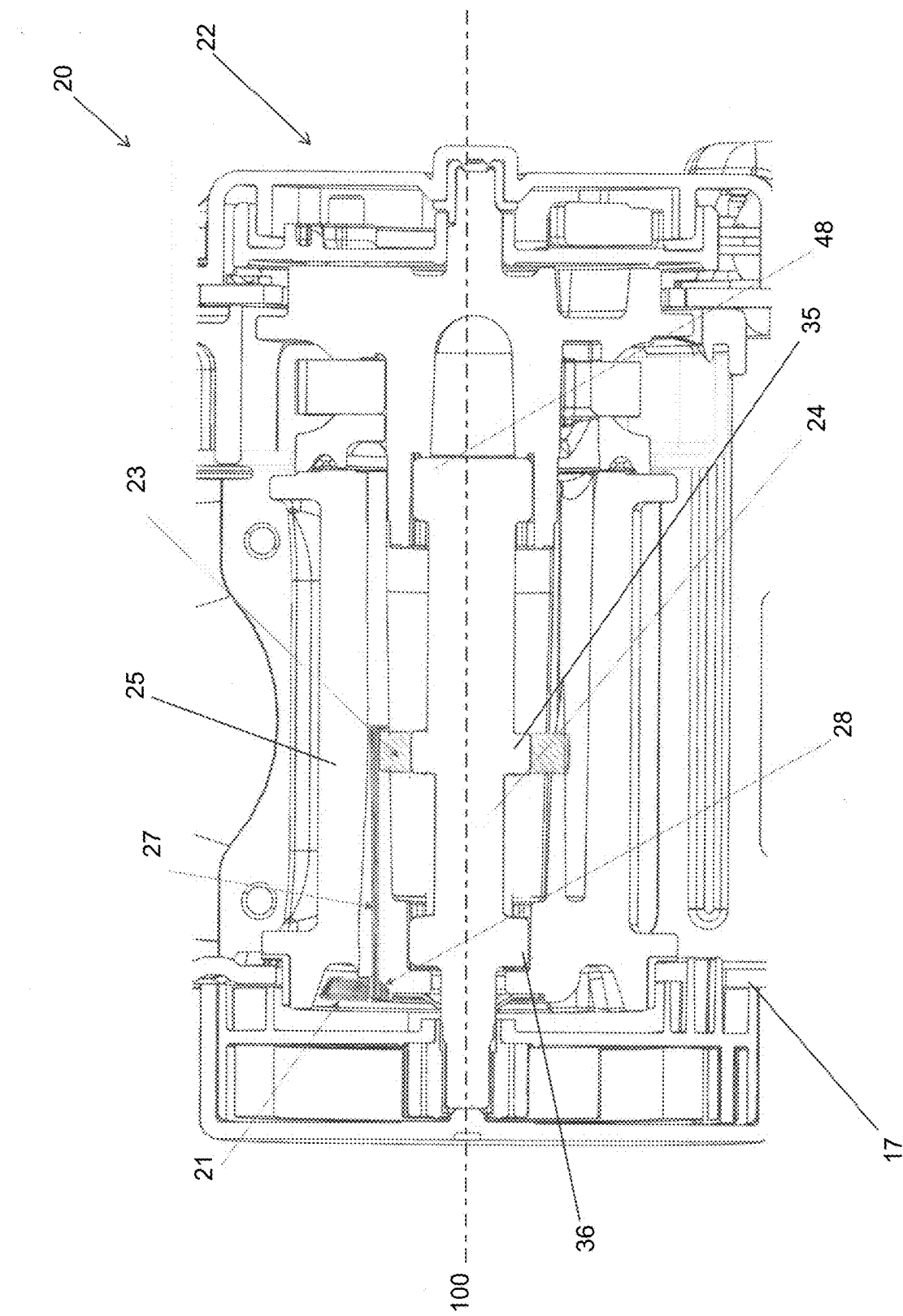
FIG. 2 is a sectional view of an exemplary embodiment of a retractor with a pretensioner and a shift assembly, for use within a vehicle.
Figure 3:
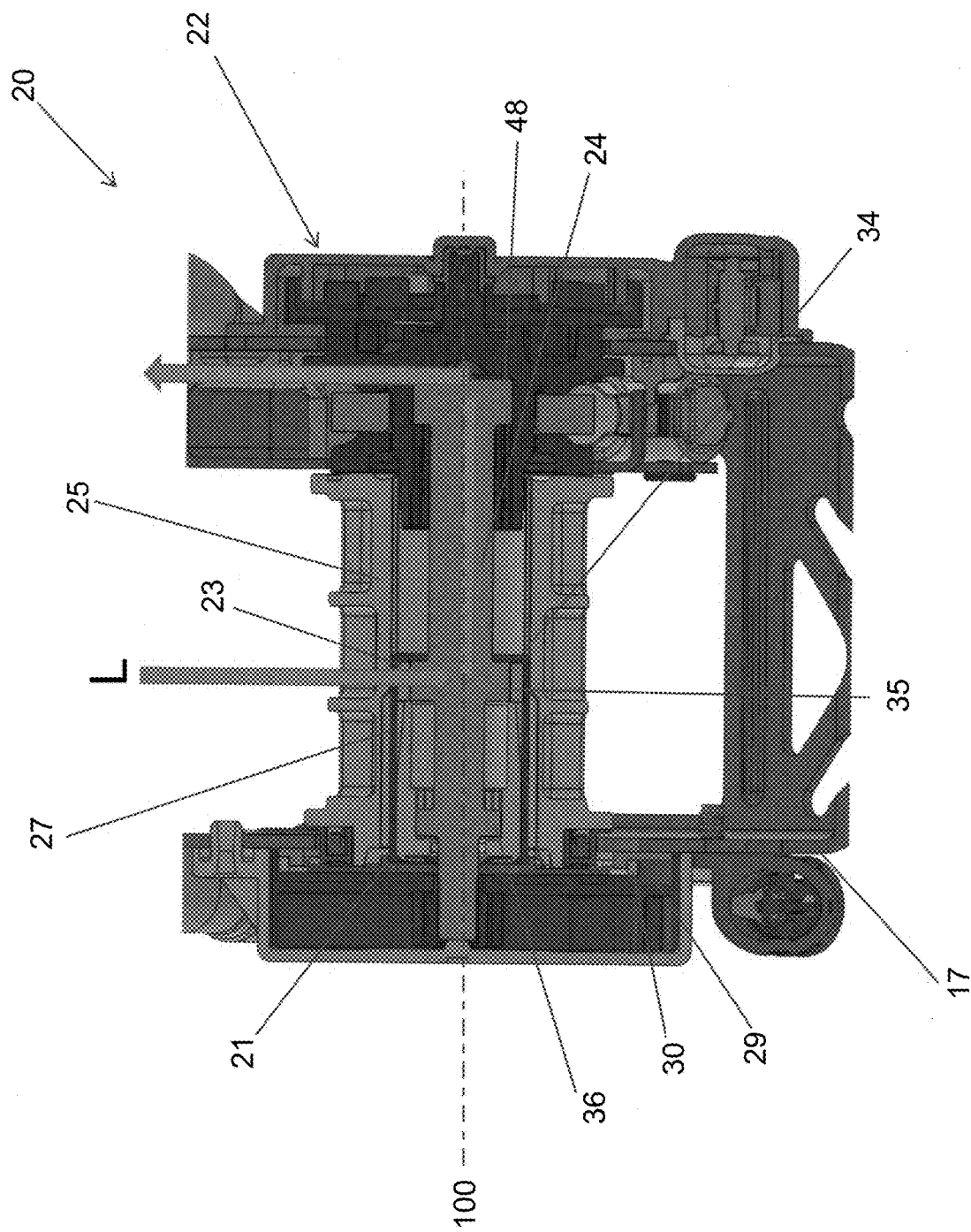
FIG. 3 is a section view of an exemplary embodiment of the retractor in an exemplary high load stage.
Figure 4:
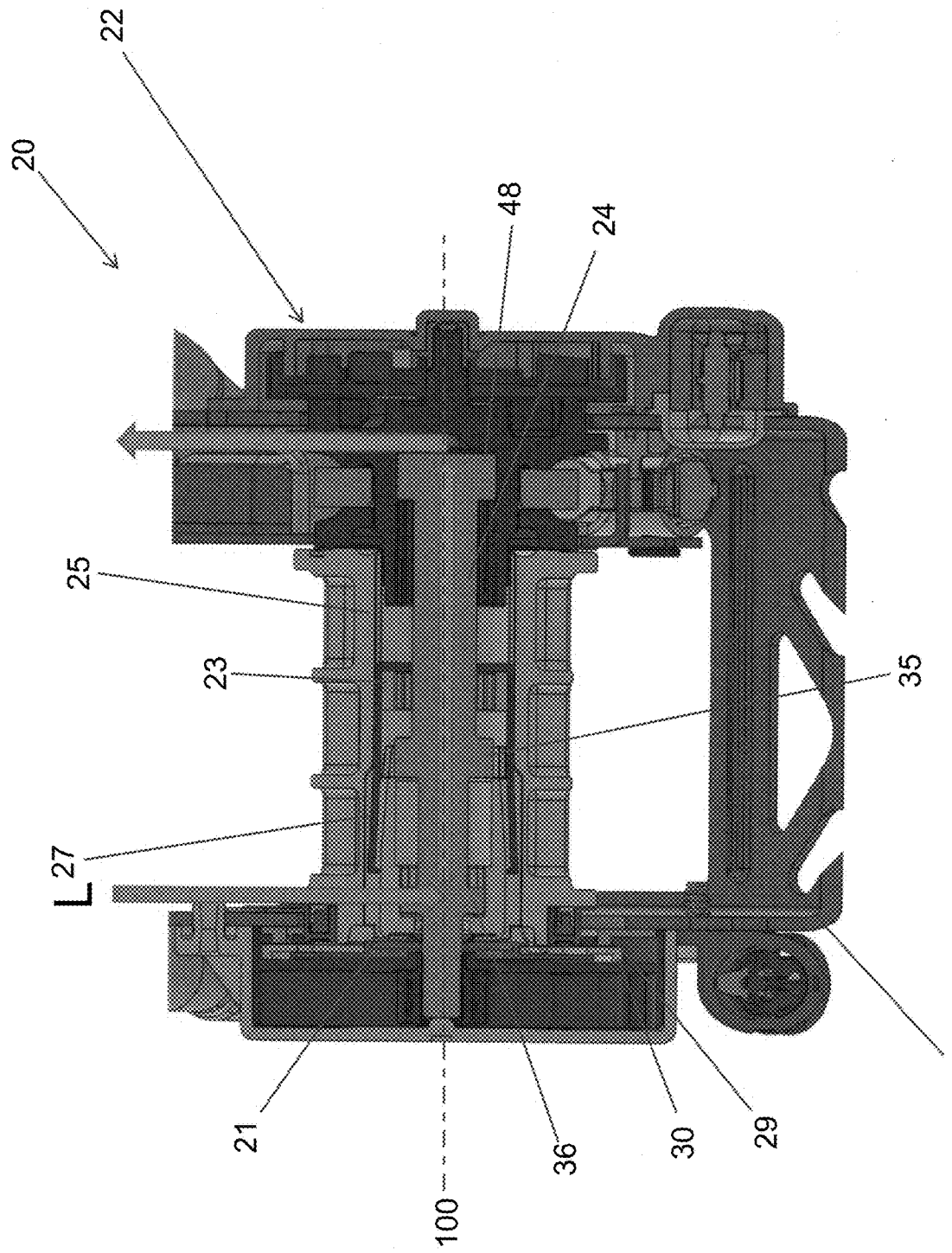
FIG. 4 is a section view of an exemplary embodiment of the retractor in an exemplary low load stage.

Referring to FIGS. 2-27, a retractor 20 is shown that includes a pretensioner 22, a frame 17, a staged torsion bar 24, and a spool 25. The retractor 20 also comprises a shift assembly comprising a load nut 23, a shift link 27, a shift collar 21, a shift ring 30, and a shift plate 29 and a pyrotechnic device 43. The shift assembly and the spool may have a substantially common pivot axis 100 (FIG. 2-4). This pivot axis 100 is about which the webbing 12 of the seat belt system 10 (FIG. 1) may be extracted or retracted. The staged torsion bar 24 may be disposed coaxial with the common pivot axis 100 and disposed within the spool 25. The shift assembly is mechanically connected to the staged torsion bar 24 via the load nut 23.

The load nut 23 is engaged to the staged torsion bar 24 via a first torsion bar spline 35. The torsion bar may also engage to the spool via a second torsion bar spline 36. The staged torsion bar may comprise two stages. The two stages may comprise an unreleased stage and a released stage. The unreleased stage may be of a high load stage configured for high load events with high acceleration. The released stage may be of a low load stage configured for low load events with low acceleration. The torsion bar 24 is selectively fixed at either the first or second splines in order to change the twisting length of the torsion bar. At the unreleased stage, the first spline 35 is fixed and the torsion bar 24 experiences twisting only through the high load stage. The pretensioner 22 may be constructed according to known methods and may have its own separate pyrotechnic device. For example, the pretensioner may be a ball-type pretensioner. The pretensioner 22, may include a coupling member (e.g., a spherical or ball member, not shown) to drive rotational motion of the spool. The pretensioner 22 is non-reversible so that, once the pretensioner 22 deploys to retract the webbing 12 of the seat belt system 10, the pretensioner 22 may not be rotated in the webbing extracting direction.

The load nut 23 can be made from cast Aluminum or Zinc or any material that can withstand the required load experienced by the retractor 20. The load nut 23 includes a load nut spline hub 37. The entire load nut can be coated with a low friction material to aid in the self-release of the load nut. The load nut includes a load nut slot 38 which engages to spool teeth 44. The load nut 23 is on a self-release configuration with the spool teeth 44 via the load nut slot ramp 39. The load nut slot ramp 39 is angled such that the rotation of the spool 25 displaces the load nut 23 in the axial direction along axis 100. The load nut 23 comprises a load nut spline hub 37 which is disposed internally to engage the first torsion bar spline 35. The load nut 23 selectively couples the spool 25 to the unreleased stage (e.g. high load stage) of the staged torsion bar 24.

To prevent load nut 23 from displacing axially, the shift link 27 is placed to selectively engage the load nut 23 to the spool 25 and the staged torsion bar 24. The shift link 27 holds the load nut 23 to the spool teeth 44. The shift link 27 comprises shift link arms 19 which extend axially and a shift link ring 34 which extends circumferentially. The shift link ring 34 may be coaxial with the load nut 23 and directly adjacent to the load nut 23 to engage the load nut 23 to the spool and staged torsion bar. Shift link arms 19 may extend coaxially with the spool 25 and be in a self-release sliding engagement 28. Ends of shift link arms 19 may comprise a shift link chamfer 51 which engages spool chamfer 52. This engagement allows the shift link 27 to self-release from the spool 25, allowing the load nut 23 to disengage. The shift link 27 may be made from glass filled Polyoxymethylene (POM) or any other material with high strength and low friction properties.

The shift link 27 is selectively engaged to the spool 25 via the shift collar 21. The shift collar 21 holds the shift link arms 19 to the spool 25 by surrounding the arms circumferentially. The shift collar 21 may be disc shaped with a lip that holds the shift link arms 19 in place. The shift collar 21 may release the engagement to the shift link 27 by displacement of shift collar 21. The displacement of the shift collar is accomplished by the mechanism of the shift plate 29, shift ring 30, and a pyrotechnic device 43. The shift ring 30 engages the shift collar 21. The shift ring 30 displaces the shift collar 21 in the event the pyrotechnic device 43 is fired. The shift ring 30 may be disposed coaxial with the shift plate 29 in a stacking arrangement. The shift ring 30 may comprise a shift ring stem 31. The shift ring stem may extend radially outwards of the shift ring main body. An impact tab 32 may be located on the shift ring stem 31 and may be disposed perpendicular to the stem surface. The impact tab is configured to transfer the energy from the pyrotechnic device 43 to a rotating movement. Thus, the pyrotechnic device 43 imparts a rotation on the shift ring via a piston 41 and the impact tab 32.

Figure 8:
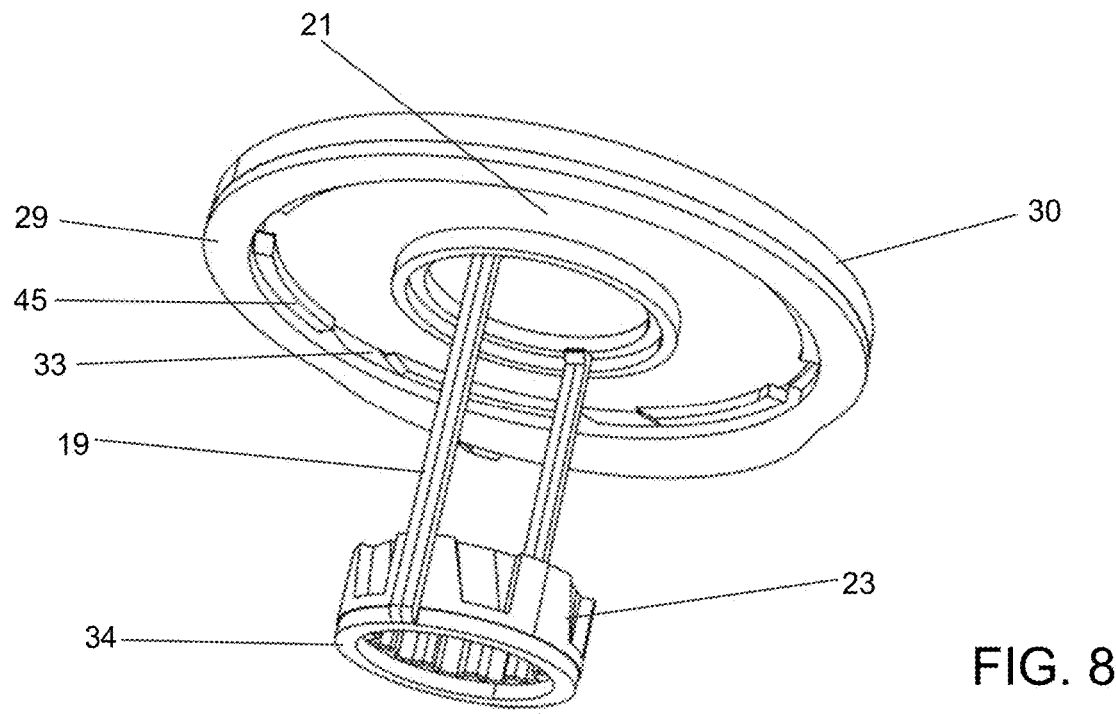
FIG. 8 is an assembled view of FIG. 5.

The shift ring 30 may comprise shift ring tabs 45 disposed radially inwards. The shift plate 29 may comprise a shift plate projection 33 which mesh with the shift ring tabs 45. The shift plate projection 33 and the shift ring tab 45 may be meshed such that the shift plate projection 33 and the shift ring tab 45 are disposed in a circumferentially alternating manner. A circumferentially alternating manner is shown in FIG. 8 of the projections 33 and tabs 45, where, in the circumferential direction, the projections 33 and tabs 45 alternate in a pattern. The shift ring tabs 45 may comprise a tab ramp 46 which are angled to aid the axial displacement of the shift ring 30 in the event the pyrotechnic device 43 is fired. The shift plate projections may also comprise projection ramps 47 that are also angled, such that the rotation of the shift ring 30 allows the tab ramp 46 to ride projection ramp 47 to displace the shift ring 30 axially away from the shift plate 29. The displacement of the shift ring 30 moves the shift collar 21 from its circumferential engagement with the shift link arms 19, which causes the shift link 27 to be released thus allowing the load nut 23 to disengage, allowing the staged torsion bar to enter the released stage.

FIG. 2 illustrates an exemplary embodiment of a retractor 20 with a pretensioner 22 shown in an unreleased stage. The retractor further comprises a frame 17, spool 25, and a shift assembly. The shift assembly comprises the load nut 23, shift link 27, shift collar 21, shift ring 30, and shift plate 29 and may be placed coaxial with the pivot axis 100. The shift assembly may further comprise a pyrotechnic device (not shown) to displace the shift ring 30. The pyrotechnic device may be a micro gas generator (MGG) 43. The shift assembly may be located opposite of the pretensioner relative to the retractor frame 20. The shift assembly is operationally connected to the spool 25 via the first torsion bar spline 35. The staged torsion bar 24 shown may comprise two stages. The two stages are a released stage (i.e. low load stage) and of an unreleased stage (i.e. high load stage). The presence of the staged torsion bar 24 will dampen the restraint characteristics of the retractor. The torsion bar is designed to deform torsionally when subjected to a predetermined torque to absorb energy during loading, imparted by the mass of an occupant during acceleration of the vehicle, to reduce the restraint force exerted on the occupant during the dynamic impact event, thereby providing improved safety to the occupant. The torsion bar 24 is rotationally coupled with the spool 25 via the second torsion bar spline 36. The pretensioner 22 may be coupled to the staged torsion bar via a third torsion bar spline 48.

FIG. 3 illustrates an exemplary embodiment of a retractor 20 in an unreleased stage. This unreleased stage shown may be of a high load stage. The load "L" shown shows the travel path of the forces through the torsion bar 24. The forces only travel through a thicker portion of the staged torsion bar, and the thicker portion of the torsion bar becomes the limiting factor for dampening. An exemplary event where a high load stage may be used is when a heavy occupant is present. A large amount of dampening is required for safety of the occupant, thus the high load stage may be used for a heavy occupant for the entire high acceleration event.

FIG. 4 illustrates an exemplary embodiment of a retractor 20 in a released stage. This released stage shown may be of a low load stage. The load "L" shown shows the travel path of the forced through the torsion bar 24. The forces travel through a thinner portion of the staged torsion bar, and the thinner portion becomes the limiting factor for dampening. This released stage dampens a lower amount of energy relative to the high load stage. An exemplary event where a low load stage may be used is when a very light occupant is present. A large dampening force is not required for a very light occupant and may even be detrimental to the safety of the occupant. Thus, a lower amount of dampening force may be used. Sensors (not shown) may activate the shift mechanism to low load stage for the entire high acceleration event. Another exemplary event where a low load stage may be used is when an average weight occupant is present. During the high acceleration event, the high load stage may be used for a predetermined amount of time and the shift assembly is then triggered to shift to the low load stage. This allows for a dynamic dampening profile tailored for the forces experienced by the occupant.

Figure 5:
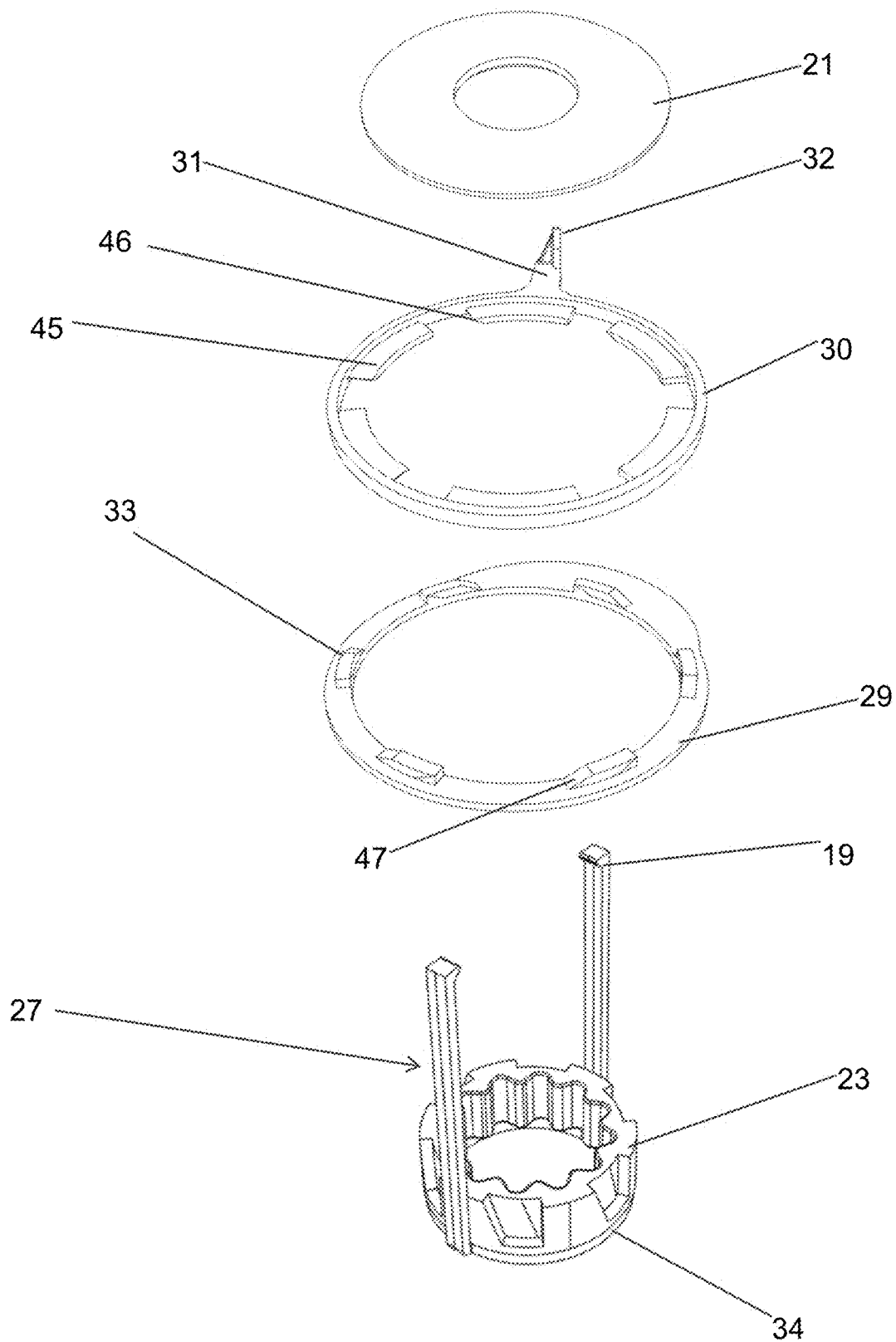
FIG. 5 is a top side exploded view of an exemplary shift assembly.

FIG. 5 illustrates an exemplary embodiment of a shift assembly. The shift assembly comprises of a load nut 23, shift link 27, shift collar 21, shift ring 30, and shift plate 29. The shift ring 30 comprises of the shift ring tab 45, shift ring stem 31, and impact tab 32. The impact tab 32 is configured to translate the energy of the MGG (not shown) to a rotation of the shift ring. The shift ring tab 45 comprises a tab ramp 46 and interacts with projection ramp 47 of projection 33 on the shift plate 29. Thus when the shift ring 30 rotates, the shift ring 30 displaces away from the shift plate 29, and causes the shift collar 21 to displace in the same direction through the engagement of the shift collar 21 to the shift ring tabs 45.

Figure 6:
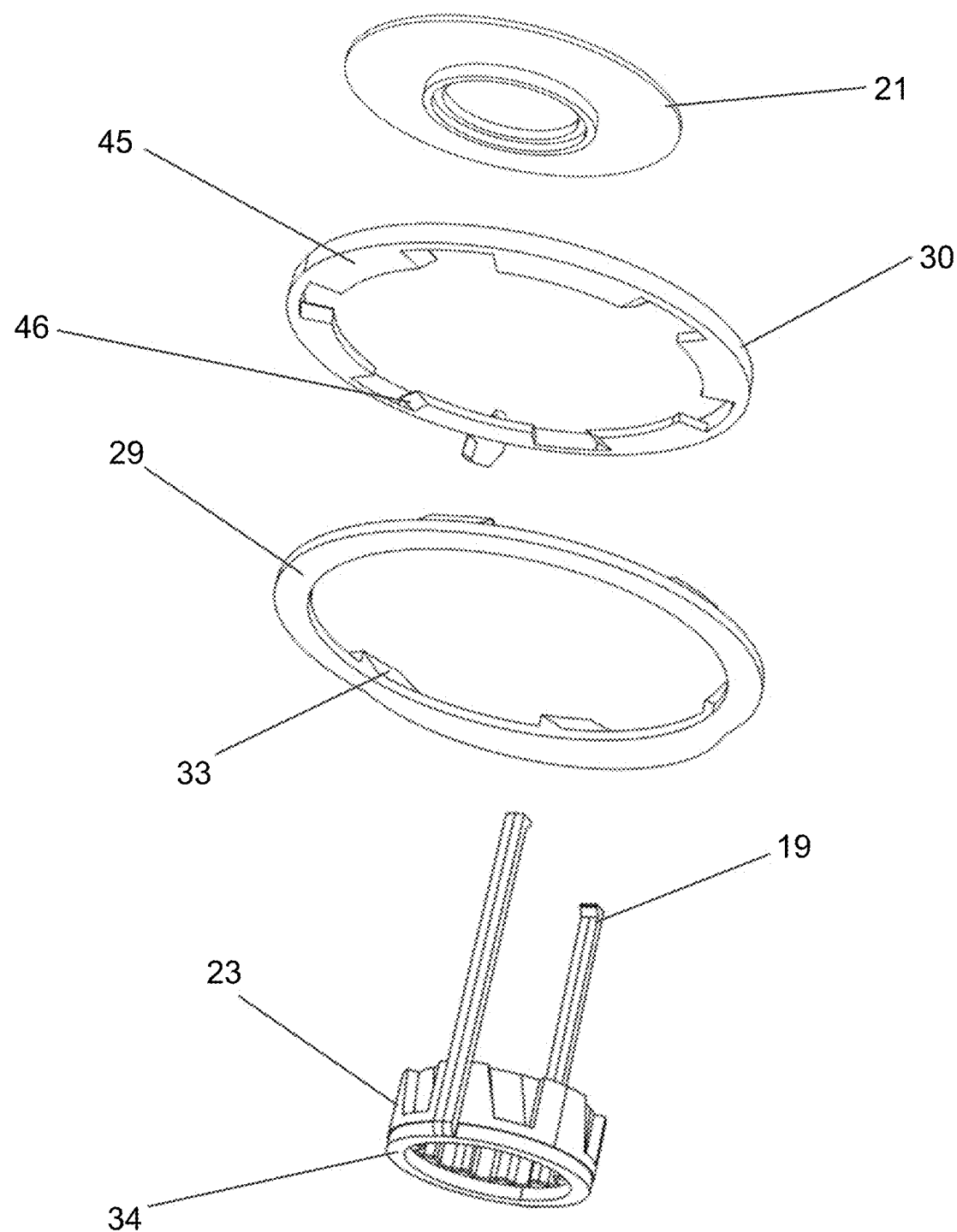
FIG. 6 is a bottom side exploded view of the exemplary shift assembly.

FIG. 6 illustrates the underside view of the exemplary embodiment shown in FIG. 5. The projection 33 aligns with the spaces between the shift ring tabs 45 to mesh the projections 33 and the tabs 45 to create a circumferential alternating pattern of the projections 33 and tabs 45 shown in FIG. 8 which shows the assembled unreleased shift assembly.

Figure 7:
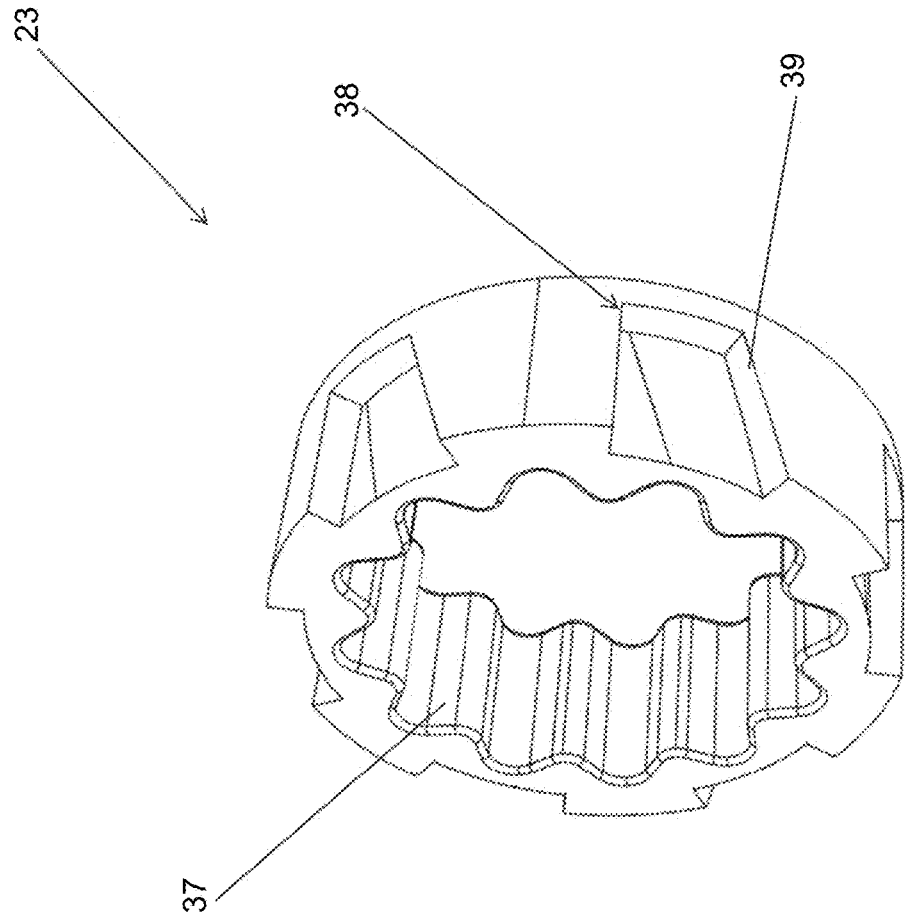
FIG. 7 is an isometric view of an exemplary load nut.

FIG. 7 illustrates the load nut 23. The load nut 23 comprises a slot 38 and a load nut slot ramp 39 which aids in the self-release of the load nut 23 when shift link 27 (not shown) is released from the shift collar 21 (not shown). The load nut 23 can be made from cast Aluminum or Zinc or any material that can withstand the required load experienced by the retractor 20. The load nut 23 includes a load nut spline hub 37 which can be coated with a low friction material to aid in the self-release of the load nut. The load nut spline hub 37 can be shaped in any way required to engage the first torsion bar spline 35.

Figure 9:
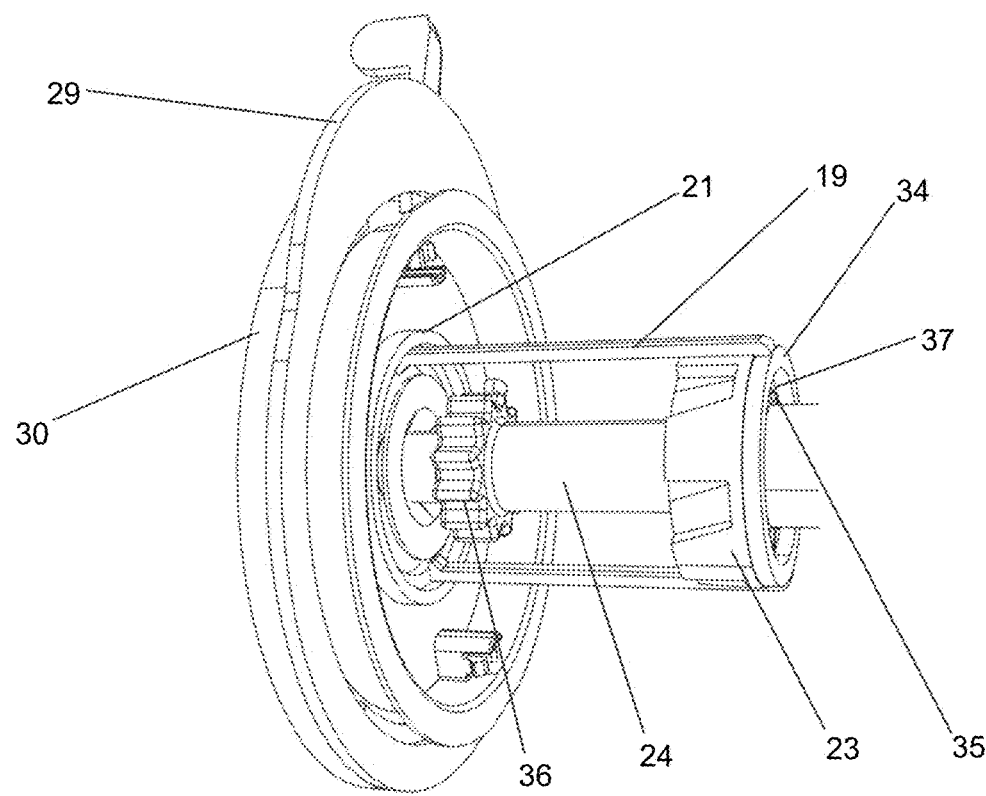
FIG. 9 is a side view of the exemplary shift assembly.

FIG. 9 illustrates the shift assembly and the staged torsion bar inserted. The staged torsion bar 24 comprises of a first spline 35 and second spline 36. The staged torsion bar 24 engages the load nut 23 via the first spline 35 and load nut spline 37. The second spline 36 engages with a spool spline hub 49 (not shown).

Figure 10:
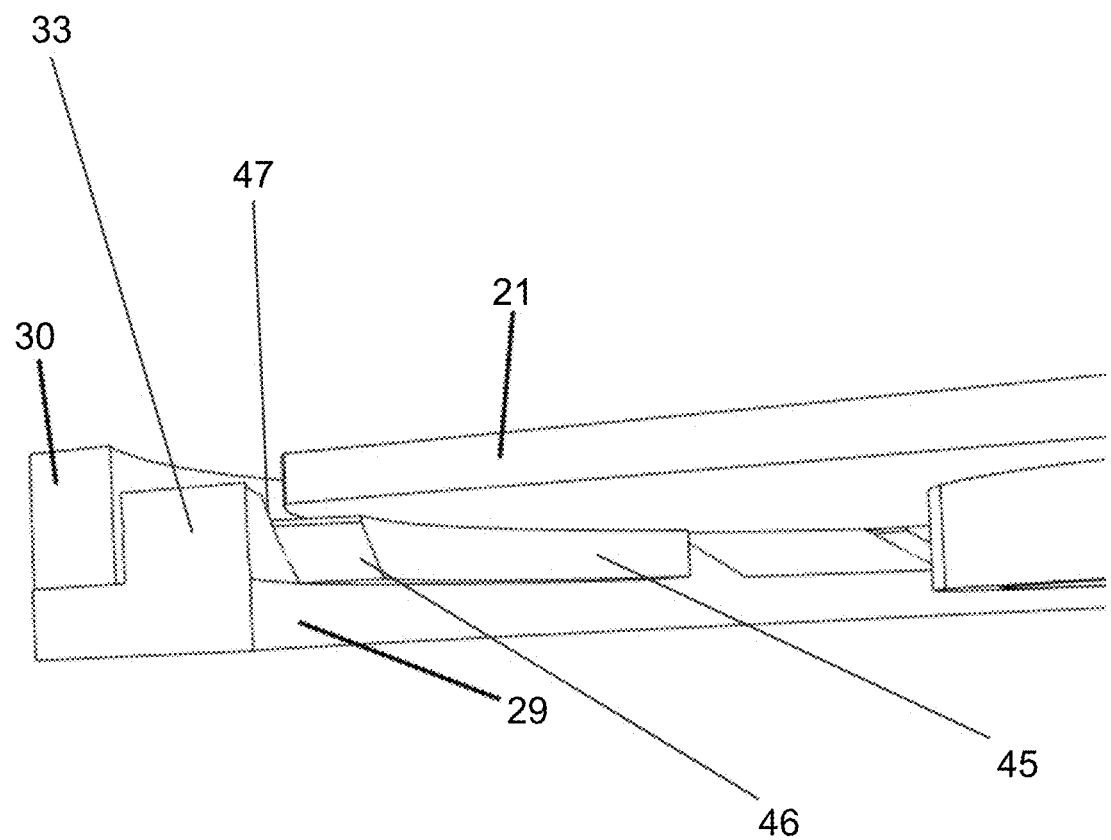
FIG. 10 is close-up sectional view of the exemplary shift assembly.

FIG. 10 illustrates a portion of the shift assembly in an unreleased stage. The shift collar 21 sits on the shift ring tab 45. The shift ring sits on the shift plate 29. The shift ring tabs 45 and shift plate projections 33 are disposed within the same circumference. This allows the tab ramps 46 and projection ramps 47 to interact with each other when the shift ring is rotated via the MGG (not shown). This allows the shift ring 30 to be displaced away from the shift plate 29 and thus the shift ring 30 pushes the shift collar 21 in the same direction.

Figure 11:
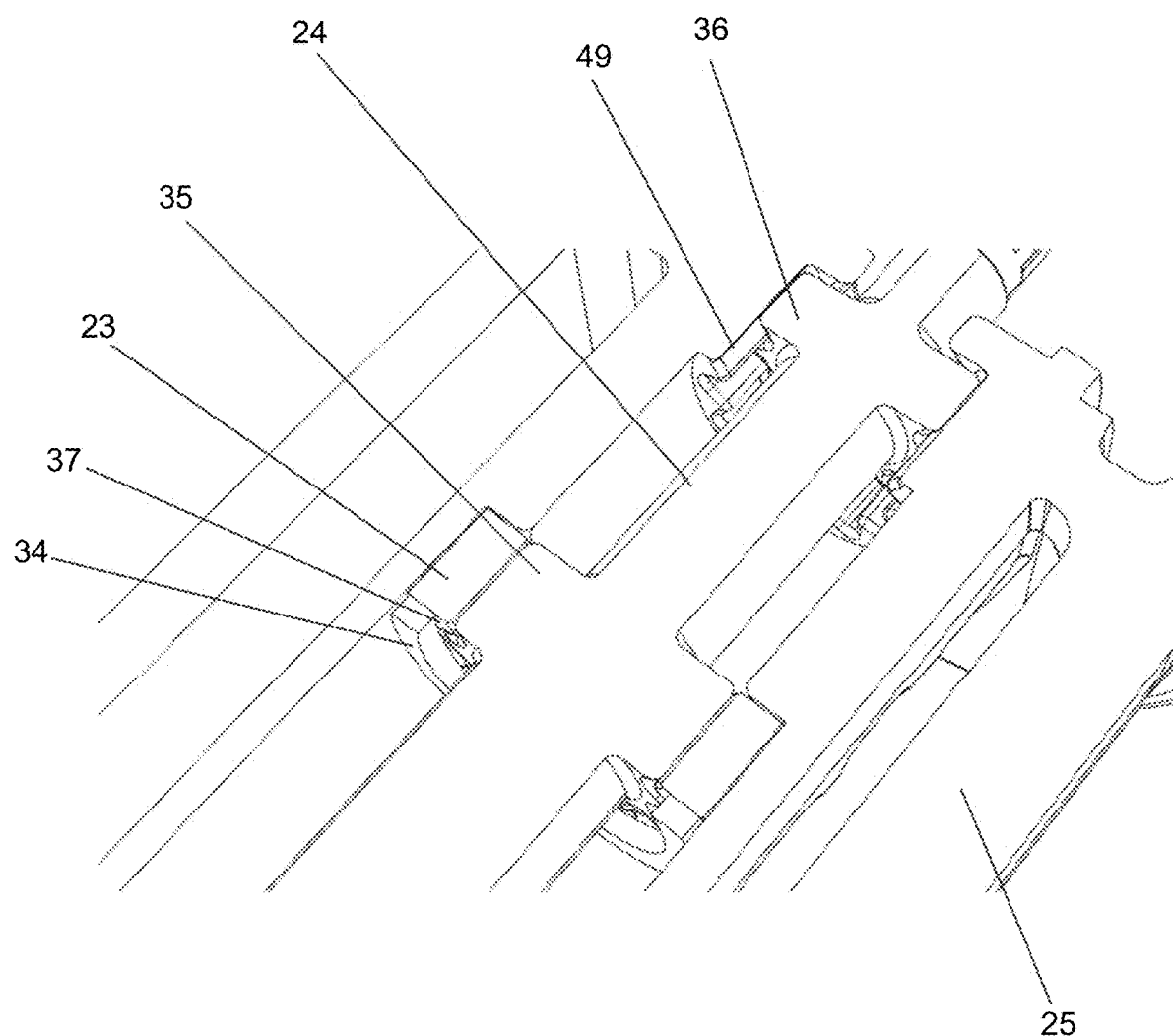
FIG. 11 is a partial sectional view of the retractor.
Figure 12:
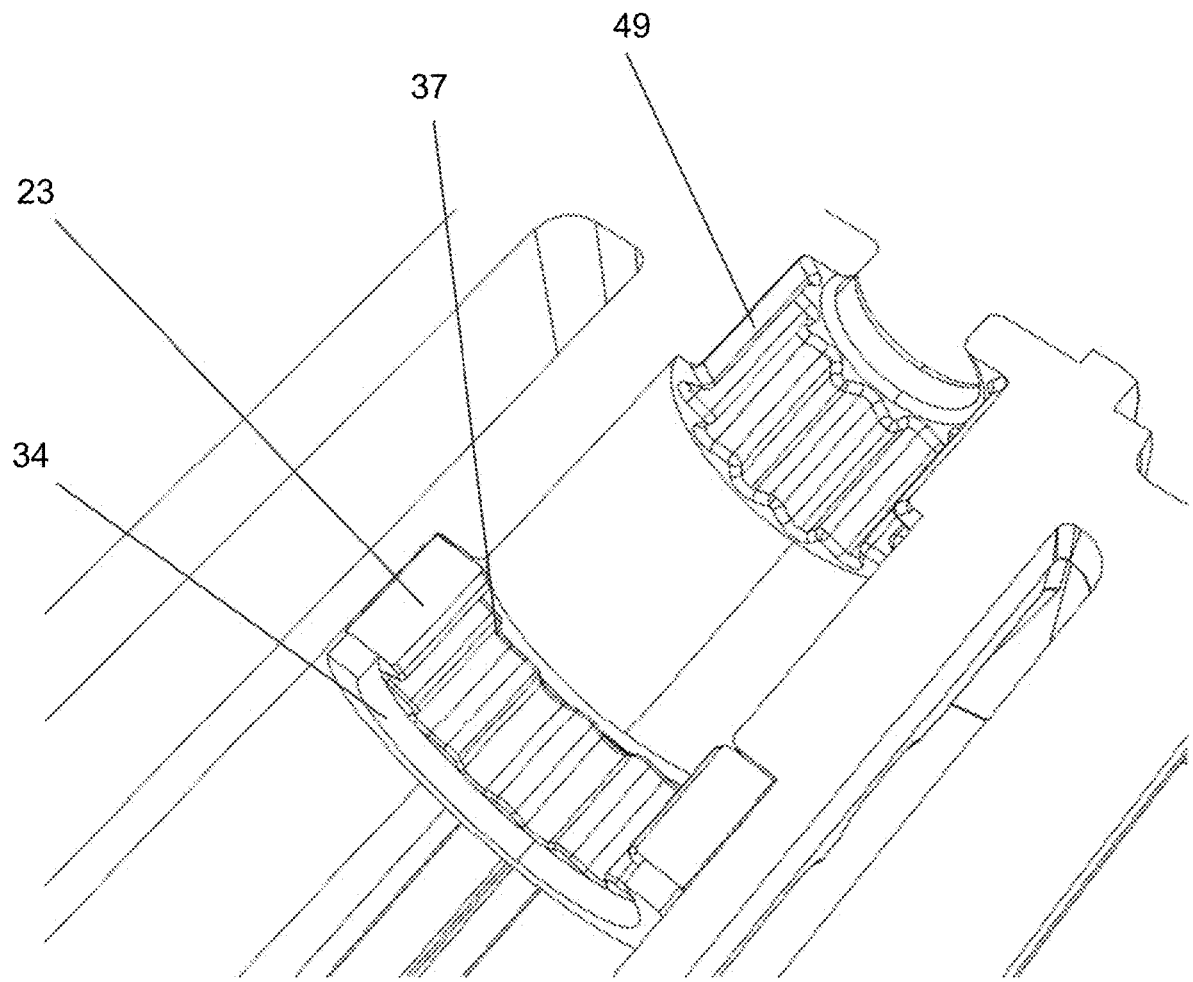
FIG. 12 is an additional partial sectional view of the retractor.
Figure 13:
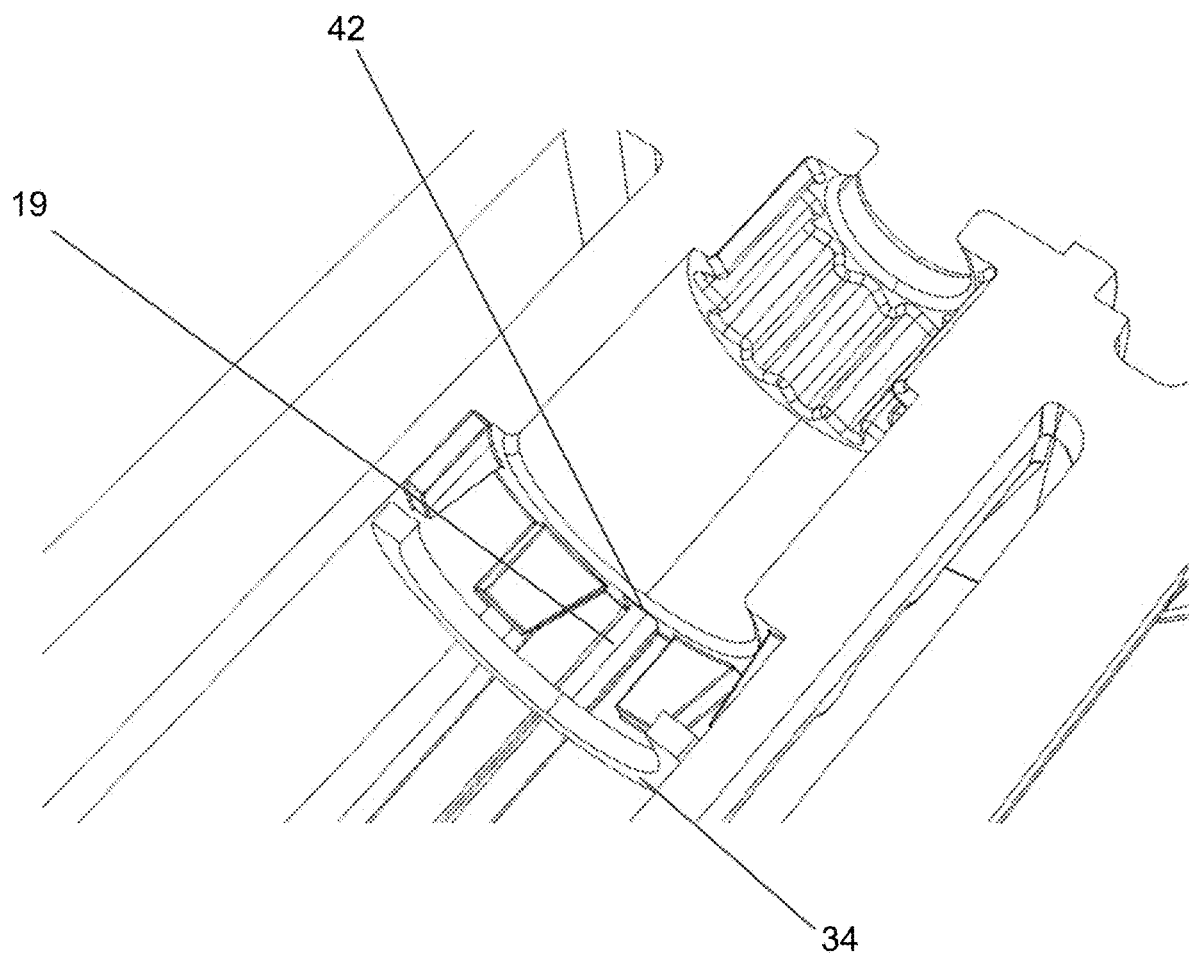
FIG. 13 is an additional partial sectional view of the retractor.
Figure 14:
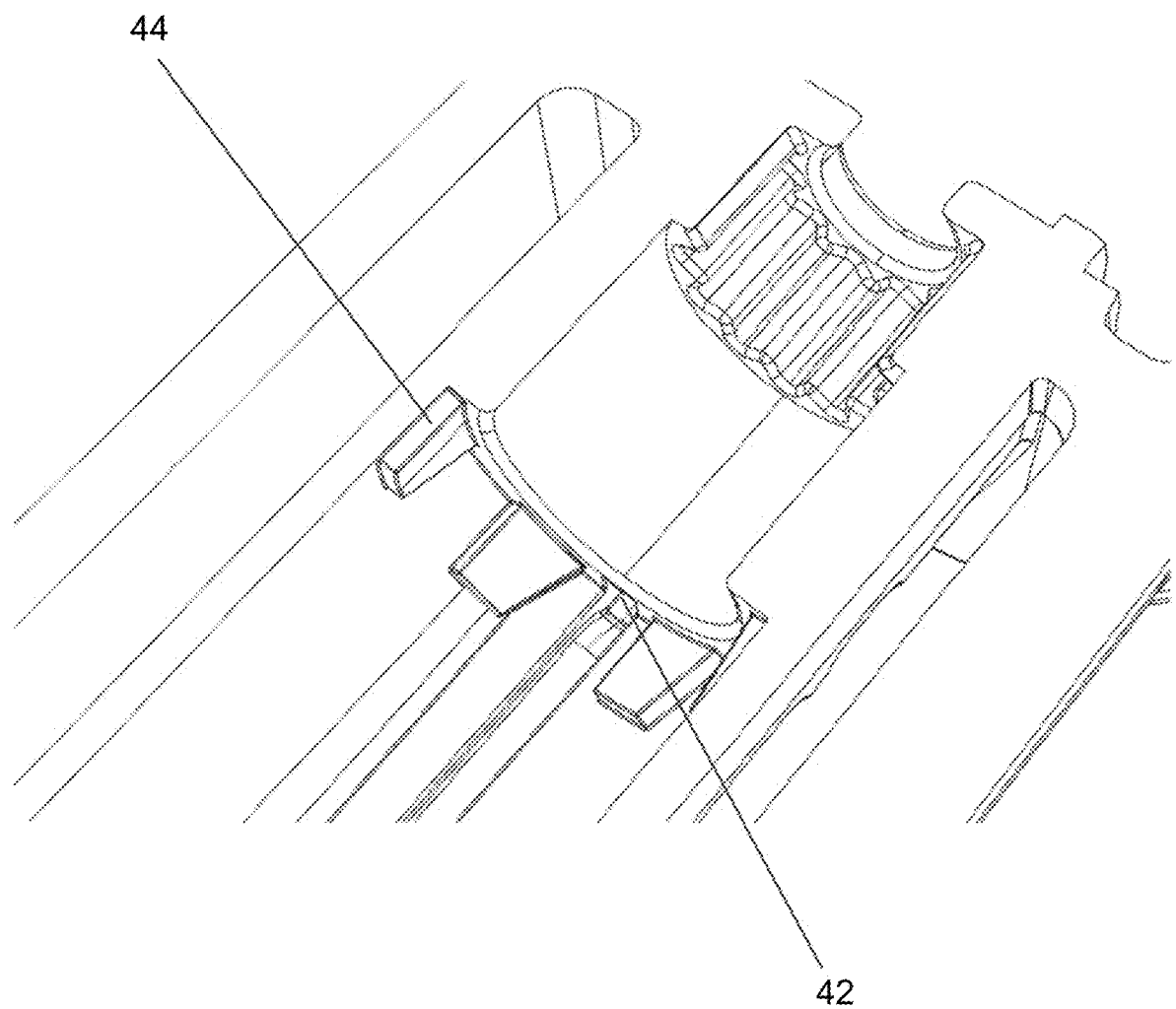
FIG. 14 is an additional partial sectional view of the retractor.

FIG. 11-14 illustrate a portion of an exemplary retractor. FIG. 11 shows the unreleased stage of the retractor. The staged torsion bar 24 engages the load nut 23 via the first spline 35 and load nut spline 37. The second spline 36 engages with a spool spline hub 49. The shift link ring 34 sits on the load nut 23 to selectively engage the load nut 23 to the spool 25. FIG. 12 illustrates the retractor of FIG. 11 with the staged torsion bar 24 omitted. FIG. 13 shows the exemplary retractor of FIG. 12 with the load nut omitted. The spool 25 comprises spool slots 42 to accommodate the shift link arms 19. FIG. 14 shows the exemplary retractor of FIG. 13 with the shift link 27 (shift link arm 19/shift link ring 34) removed.

Figure 15:
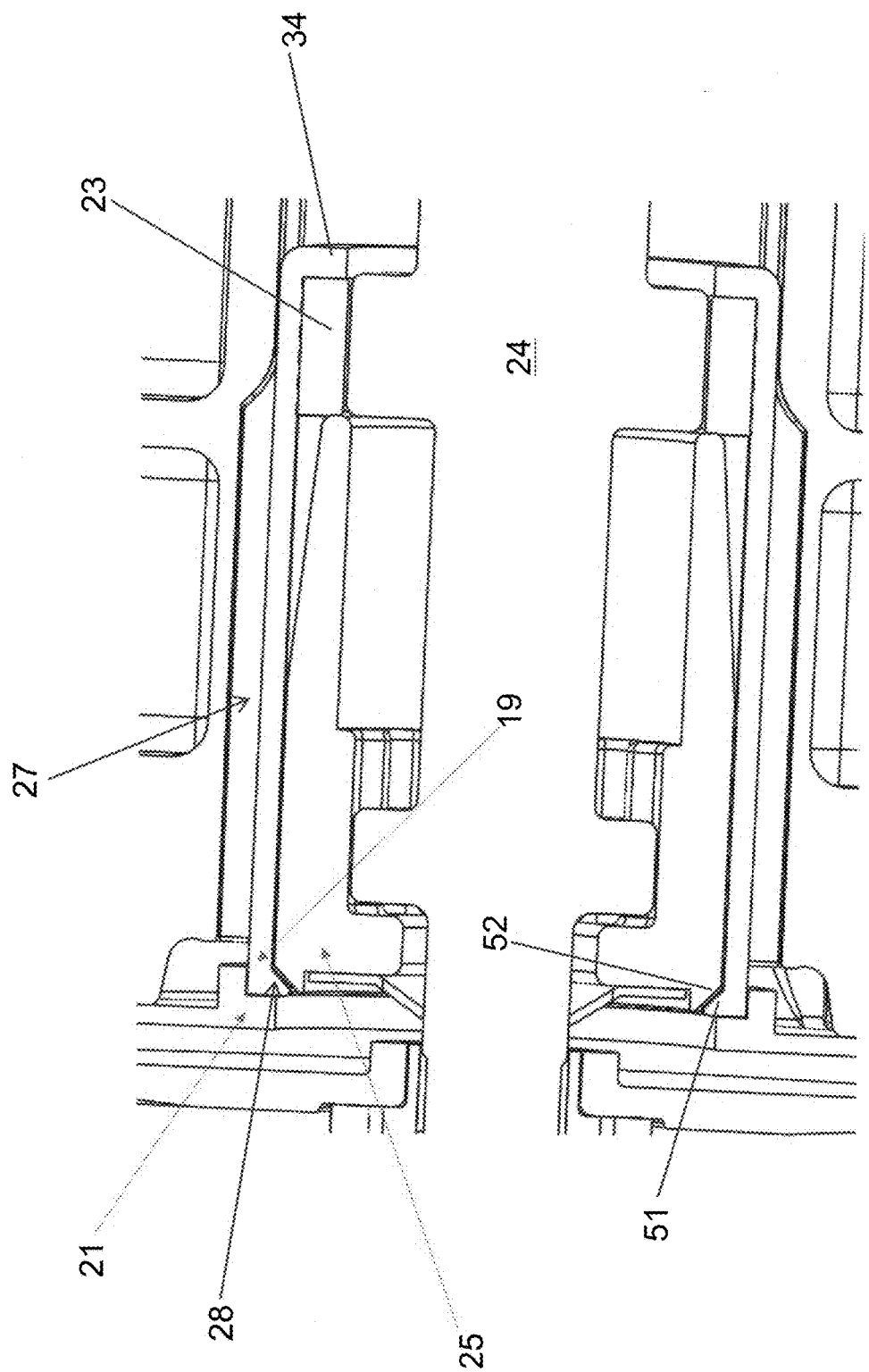
FIG. 15 is a partial side sectional view of the retractor during an unreleased stage.
Figure 16:
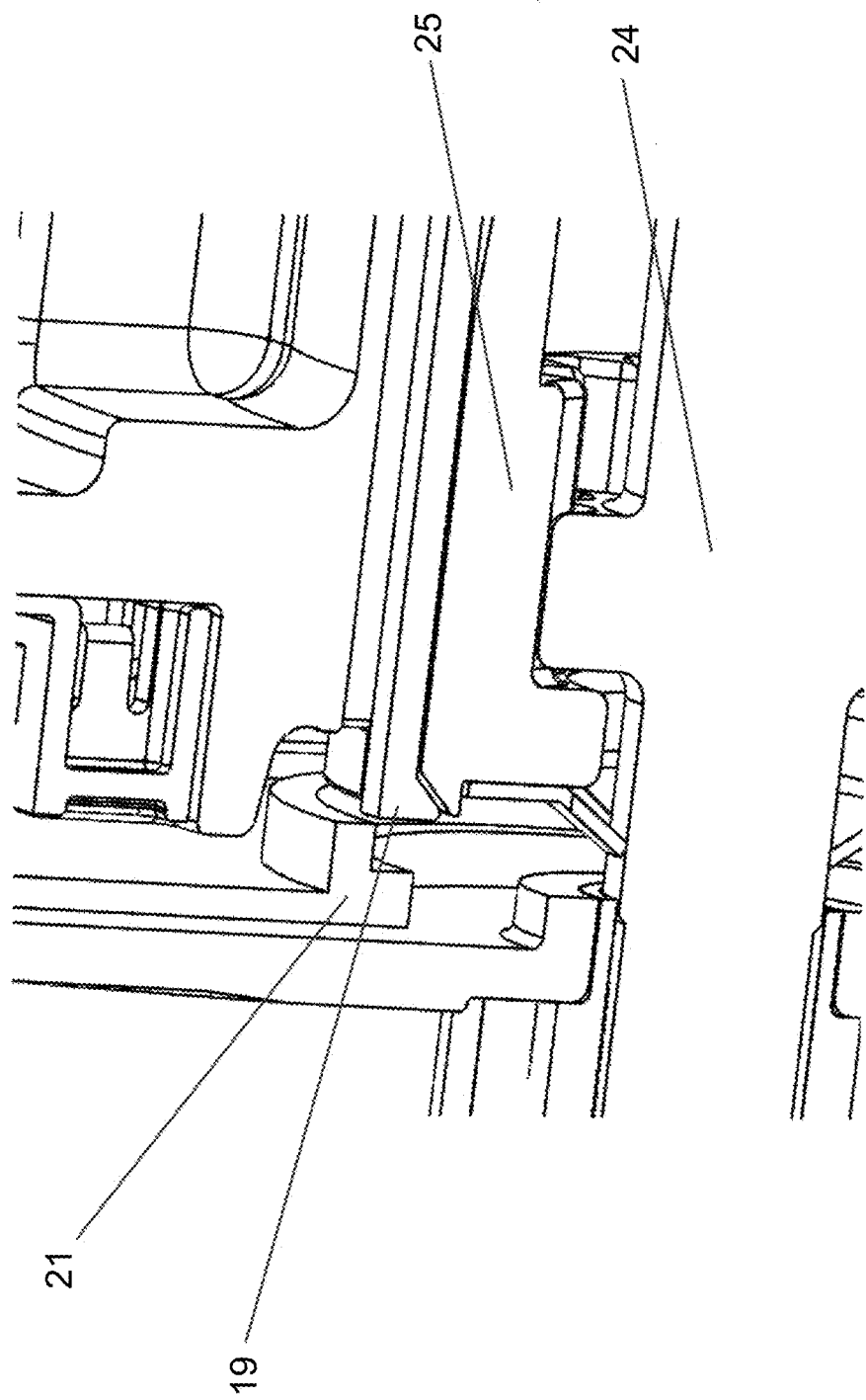
FIG. 16 is a partial sectional view of the retractor during a shift to a released stage.
Figure 17:
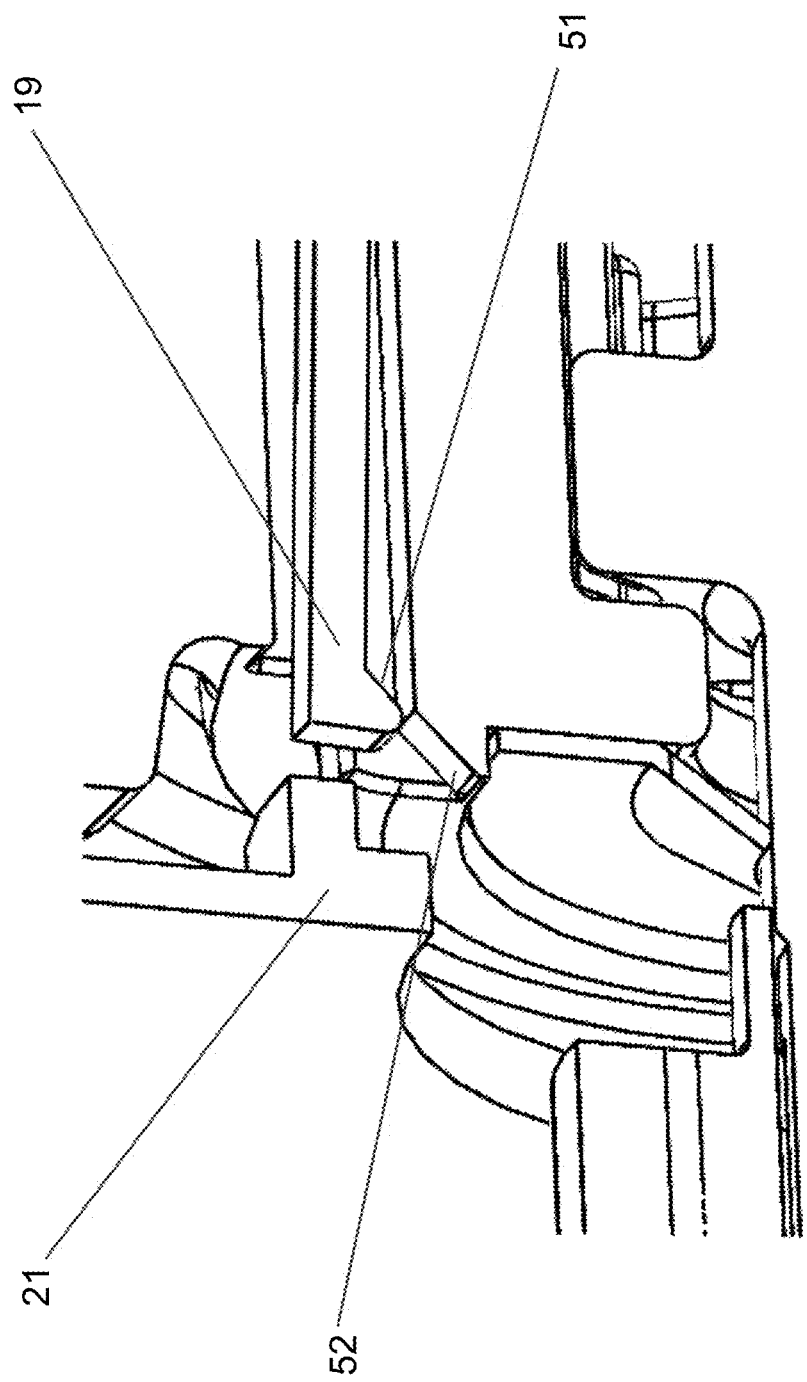
FIG. 17 is a partial sectional view of the retractor during a shift to a released stage.
Figure 18:
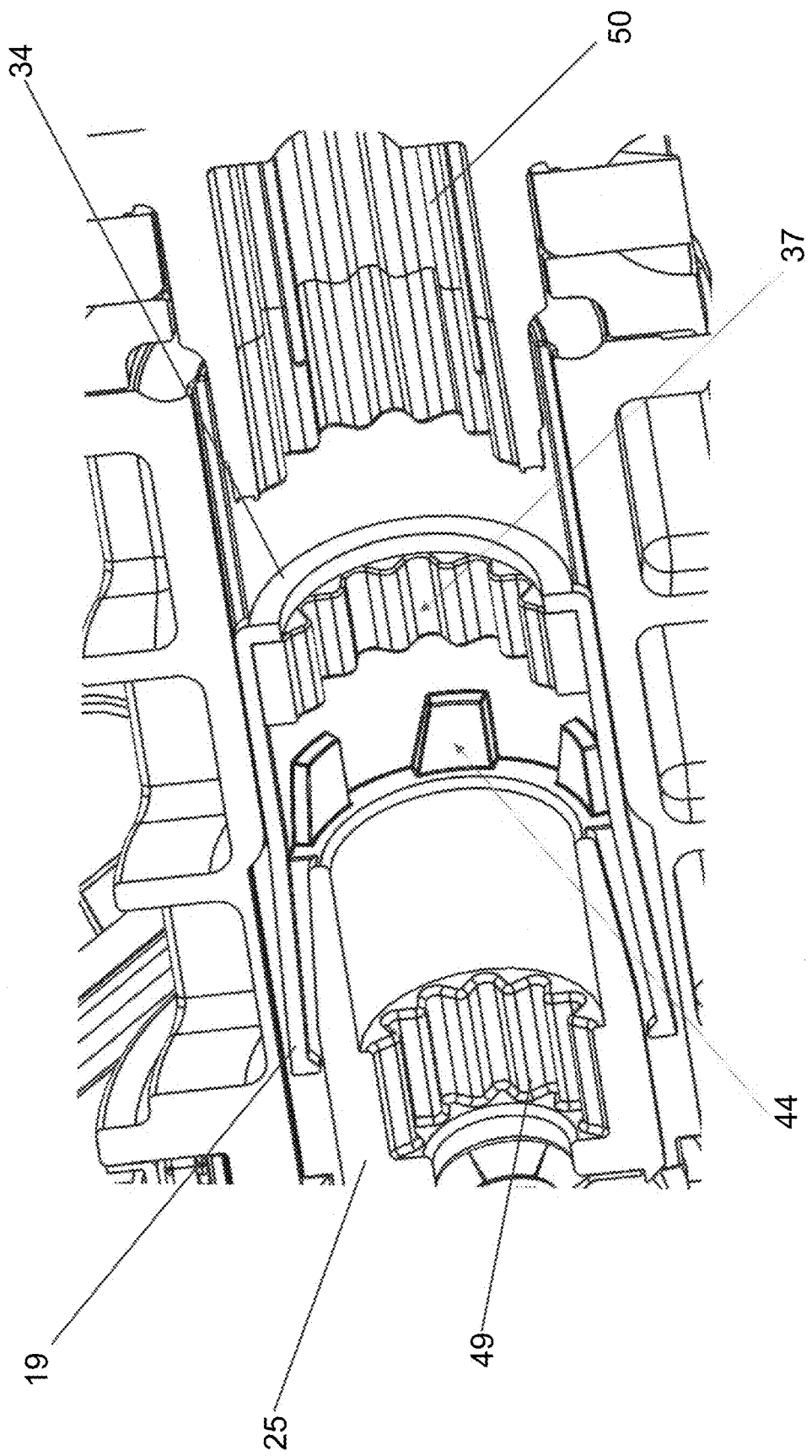
FIG. 18 is a partial sectional view of the retractor during a released stage.

FIG. 15-18 illustrate a close-up of an exemplary retractor. FIG. 15 shows the configuration in an unreleased position. The shift link arm 19 is engaged with the spool 25 in a sliding engagement 28. The sliding engagement 28 comprises a shift link chamfer 51 and spool chamfer 52. This configuration allows the shift link 27 to self-release from the spool 25 to allow the load nut 23 to disengage. FIG. 16 shows the shift collar 21 being disengaged and shift link arm 19 being released. FIGS. 17 and 18 shows the shift link arms 19 disengaging the spool 25. In FIG. 18, the staged torsion bar 24 is removed for clarity. A pretensioner spline hub 50 is shown configured to engage the third torsion bar spline 48 (not shown).

Figure 19:
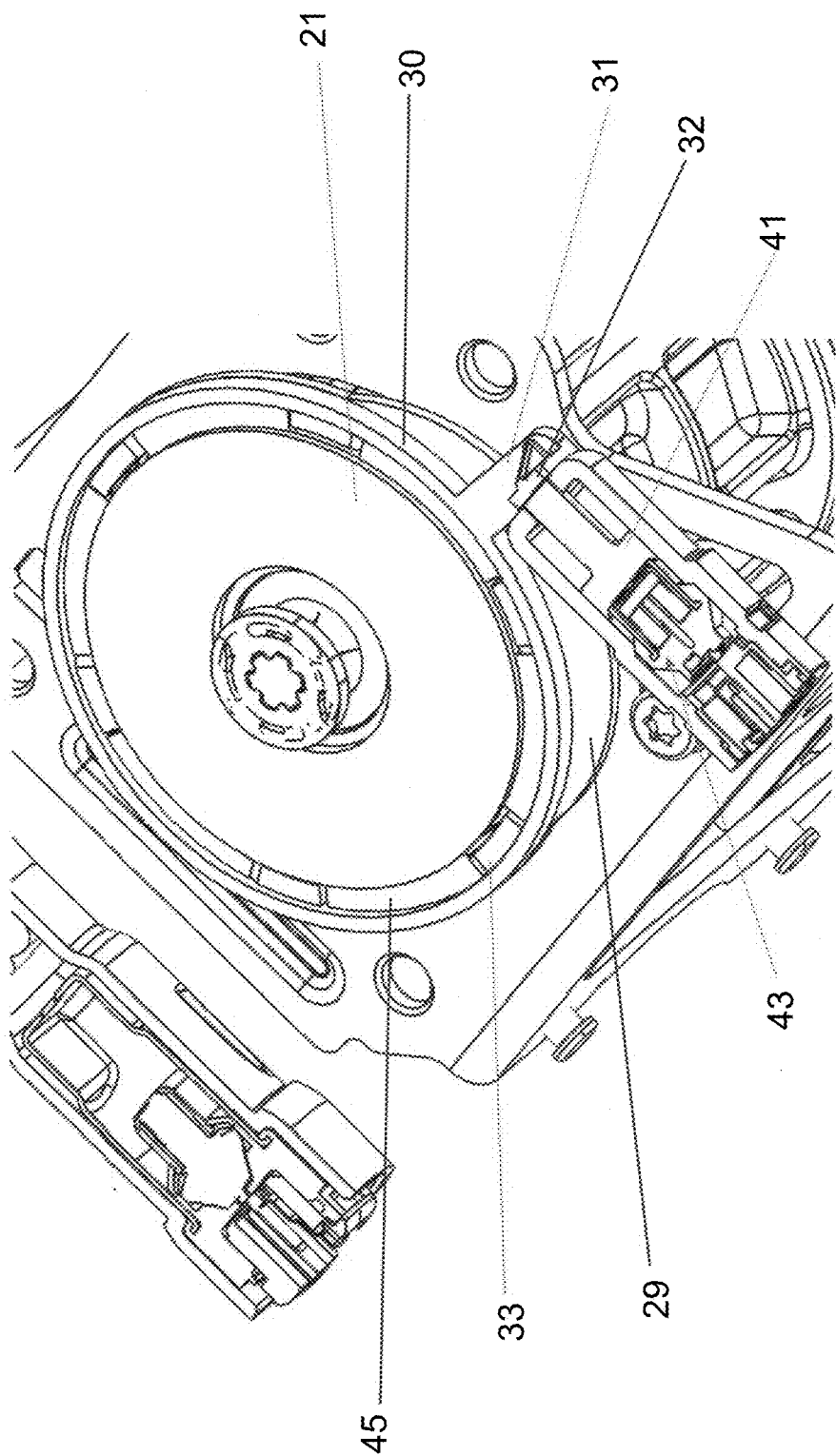
FIG. 19 is a partial side view of the retractor with a shift assembly during an unreleased stage.
Figure 20:
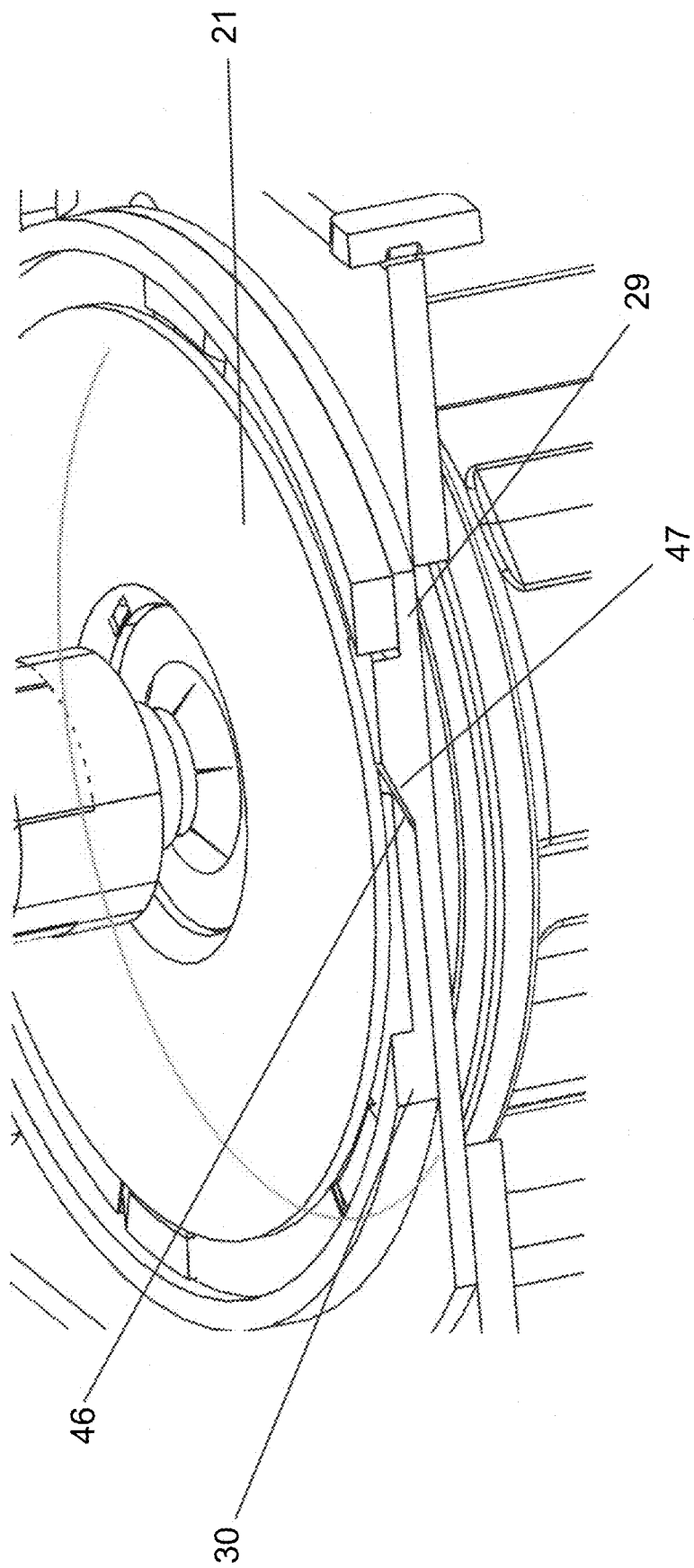
FIG. 20 is a close up view of the retractor with a shift assembly during an unreleased stage.

FIGS. 19 and 20 show a detailed view of the shift assembly during an unreleased stage. The shift collar 21 sits on top of the shift ring tabs. The shift ring sits on top of the shift plate. The shift plate aids in the displacement of the shift collar and shift ring. The pyrotechnic device can be a micro gas generator. The pyrotechnic device is offset from the pivot axis (not shown) and is configured to hit the impact tab to rotate the shift ring.

Figure 21:
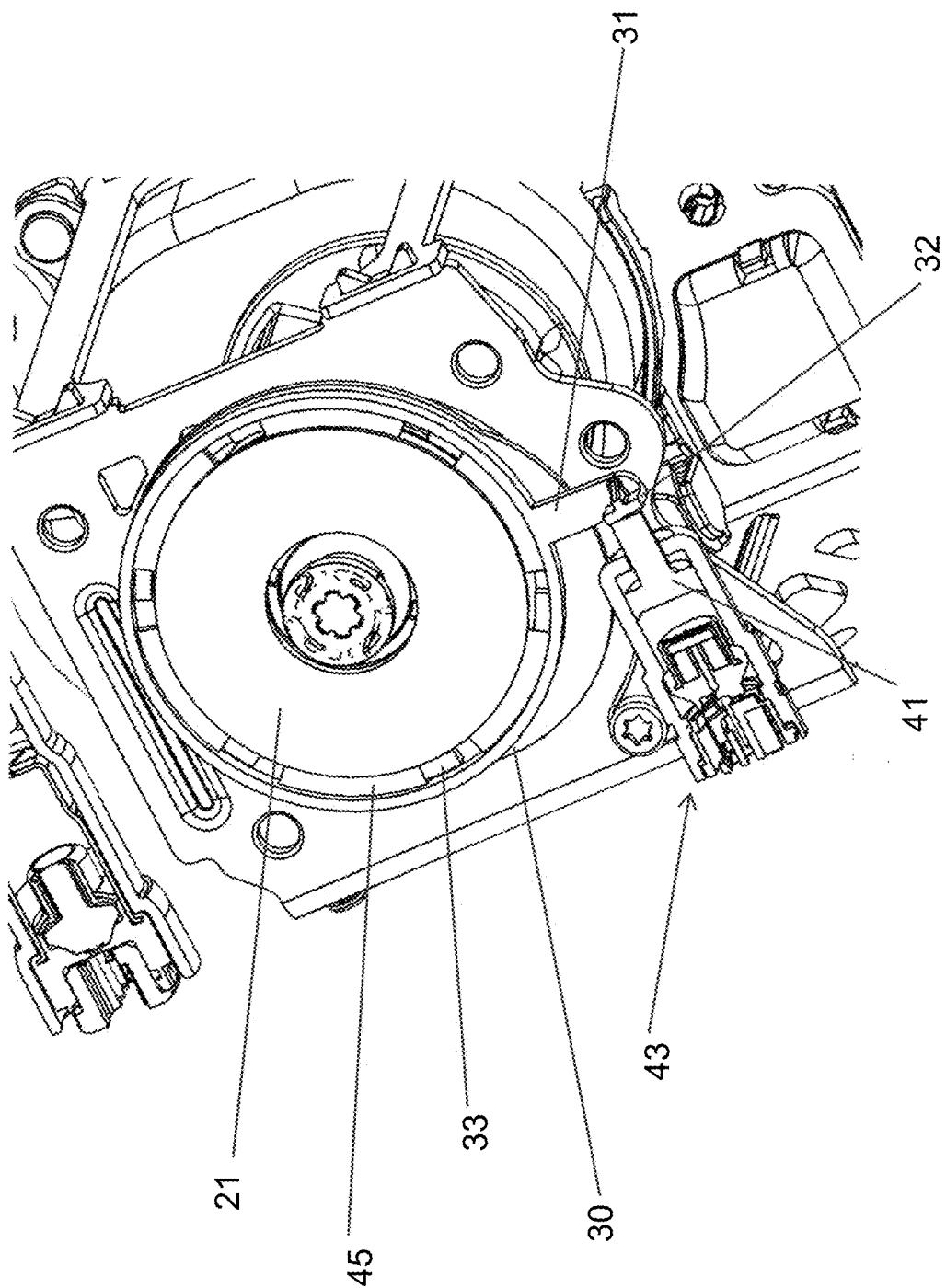
FIG. 21 is a partial side view of the retractor with a shift assembly during a released stage.
Figure 22:
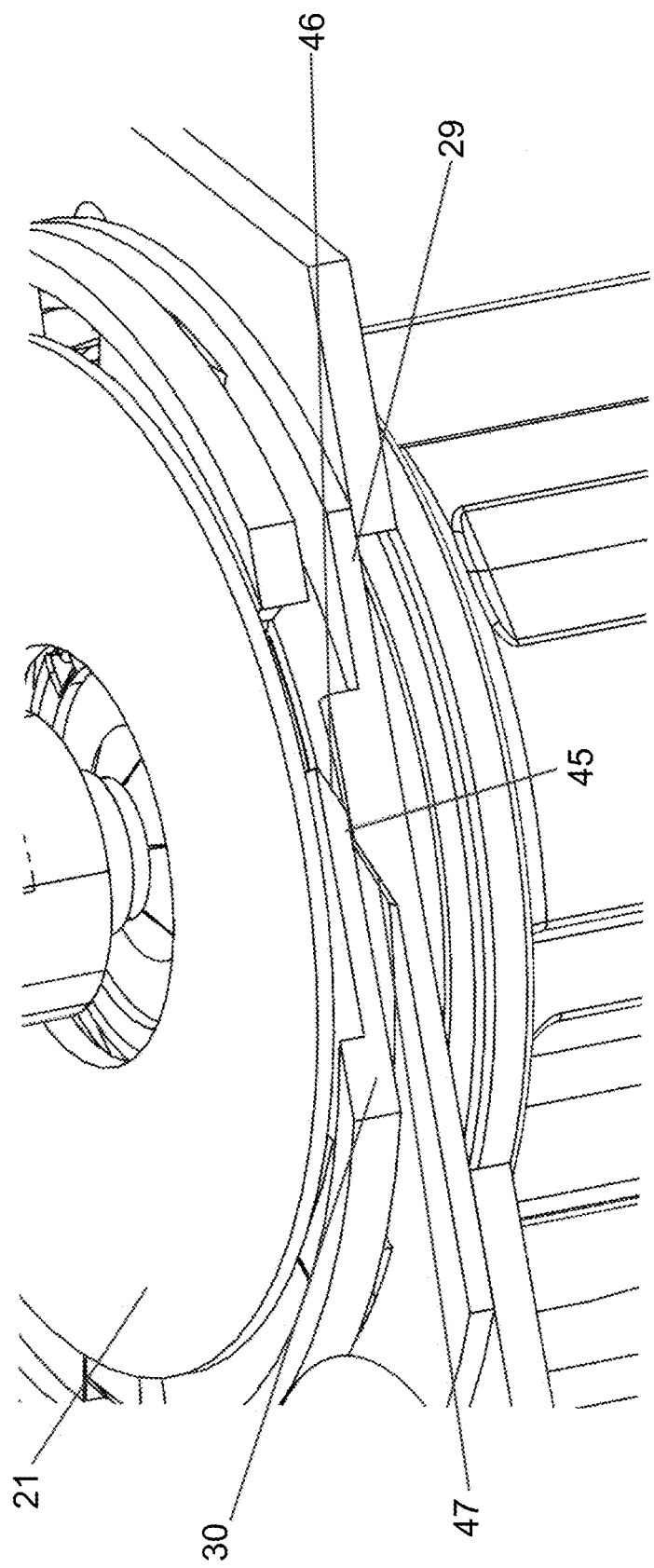
FIG. 22 is a close up view of the retractor with a shift assembly during a released stage.

FIGS. 21 and 22 show a detailed view of the shift assembly during a released stage. To transition to the released stage, the shift ring 30 rides up the shift plate 29 via the tab ramps 46 and projection ramps 47 and lifts the shift collar 21 out of engagement with the link arms 19 (not shown) allowing the link arms 19 to spread and disengage from the spool 25.

Figure 23:
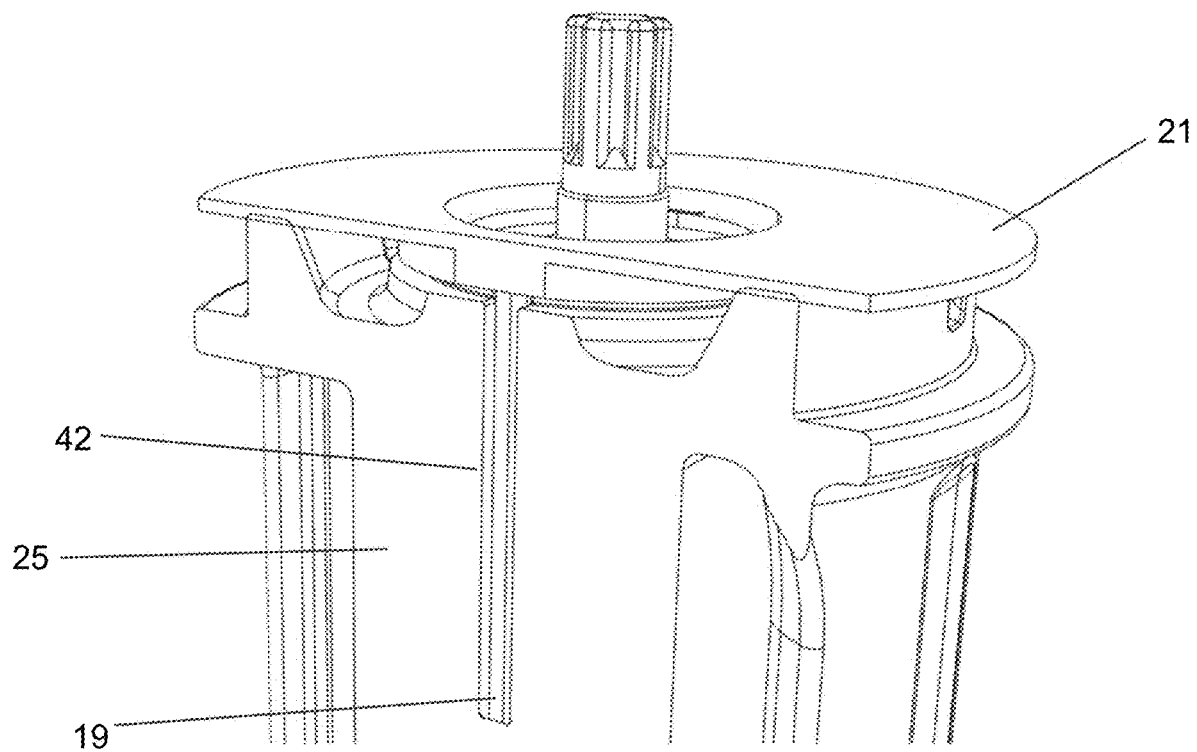
FIG. 23 is a partial side sectional view of the retractor during an unreleased stage.
Figure 24:
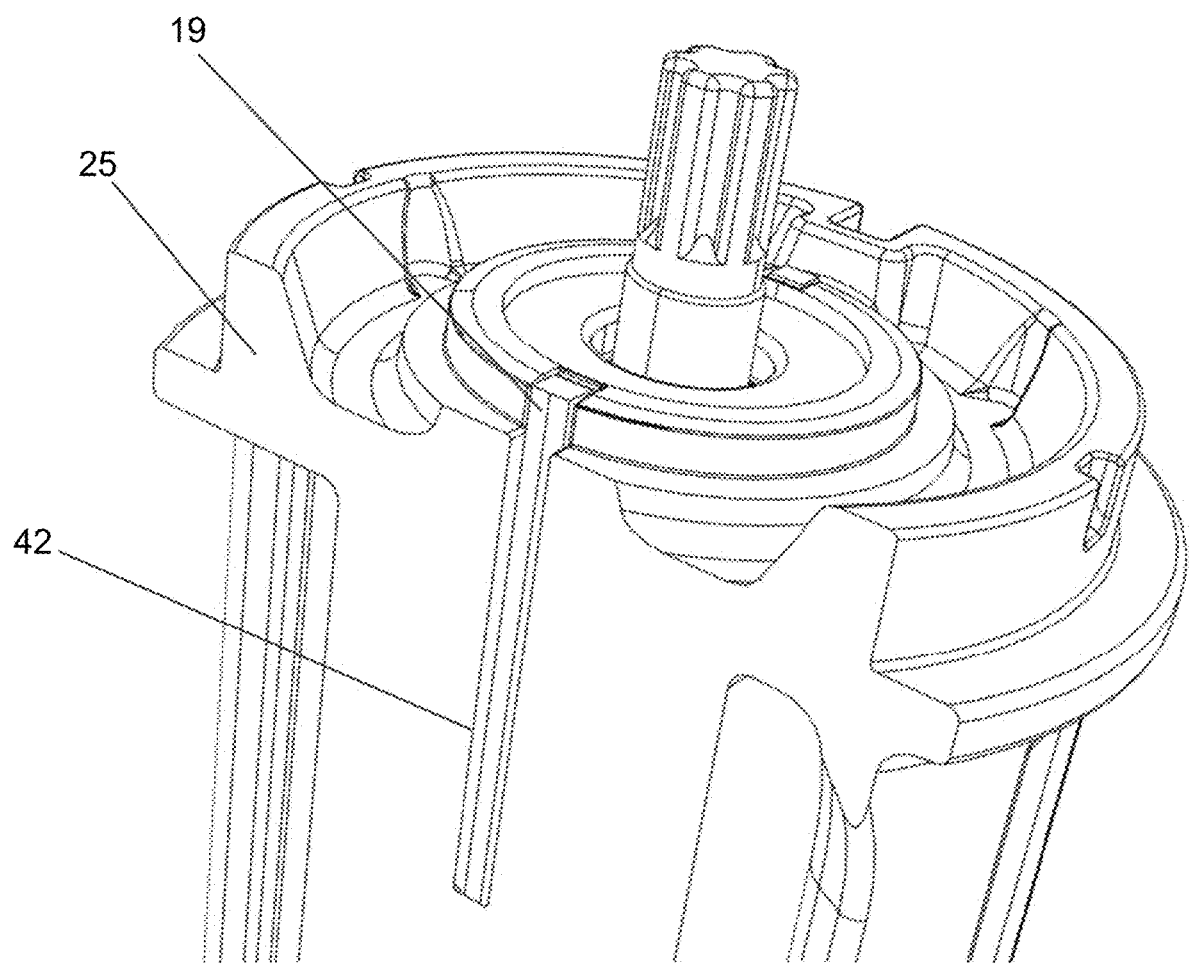
FIG. 24 is a close up side view of the retractor during an unreleased stage.

FIGS. 23 and 24 show a side sectioned view of an exemplary retractor. Shift link arms 19 are disposed in a spool slots 42. The spool slot 42 accommodates for the radial and axial movement of the shift link arms 19. Shift collar 21 is removed in FIG. 24 for clarity.

Figure 25:
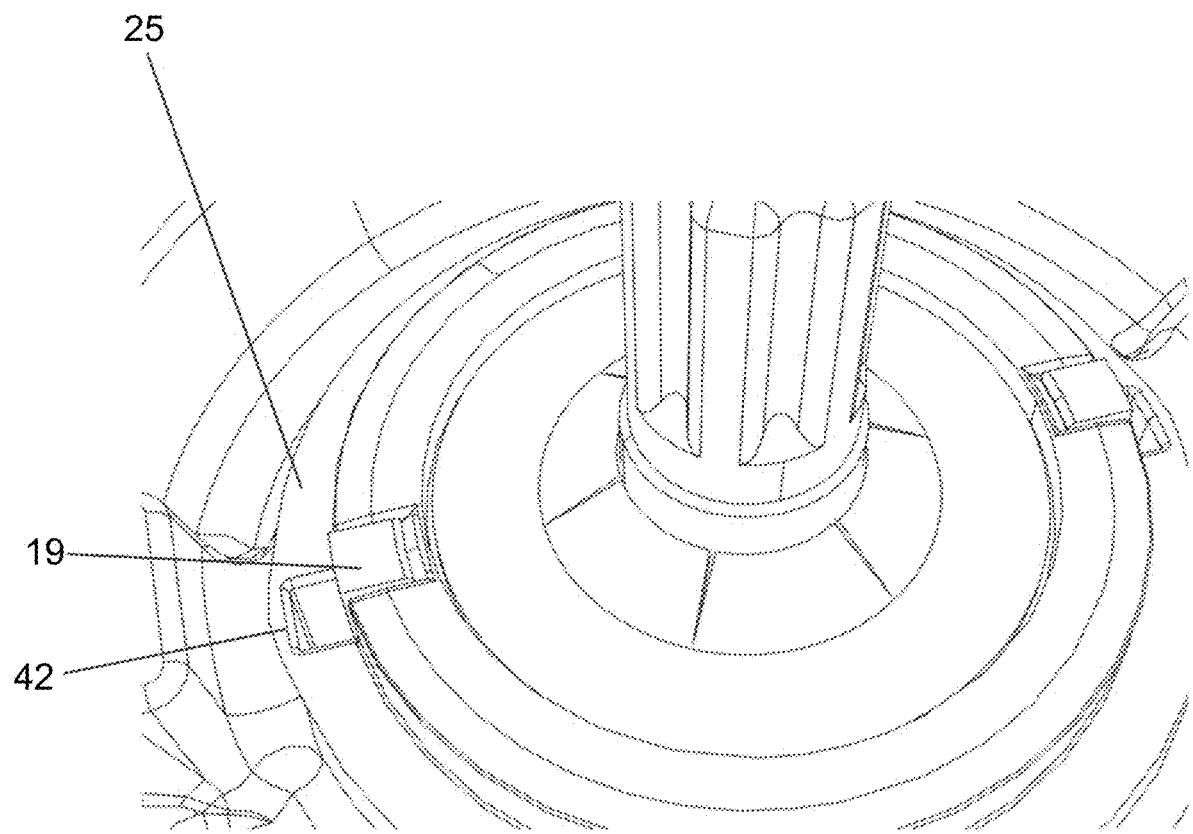
FIG. 25 is side sectional view of the retractor.
Figure 26:
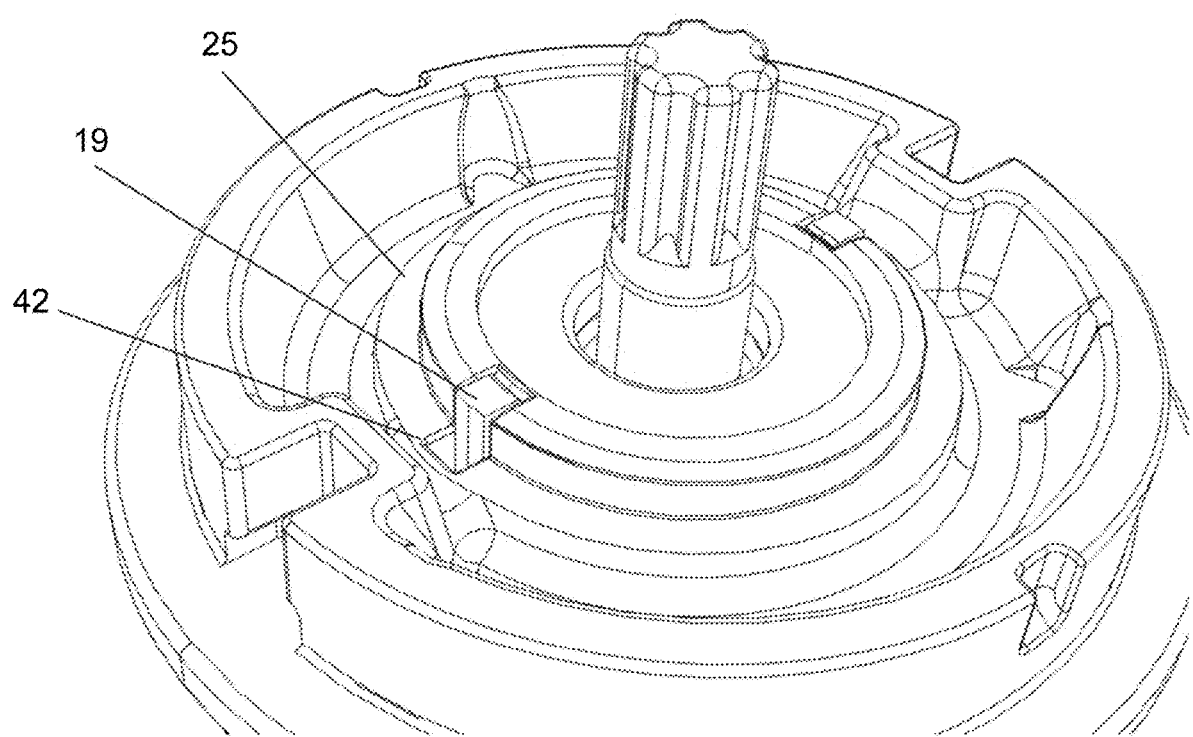
FIG. 26 is a close up view of a side view of the retractor during an unreleased stage.
Figure 27:
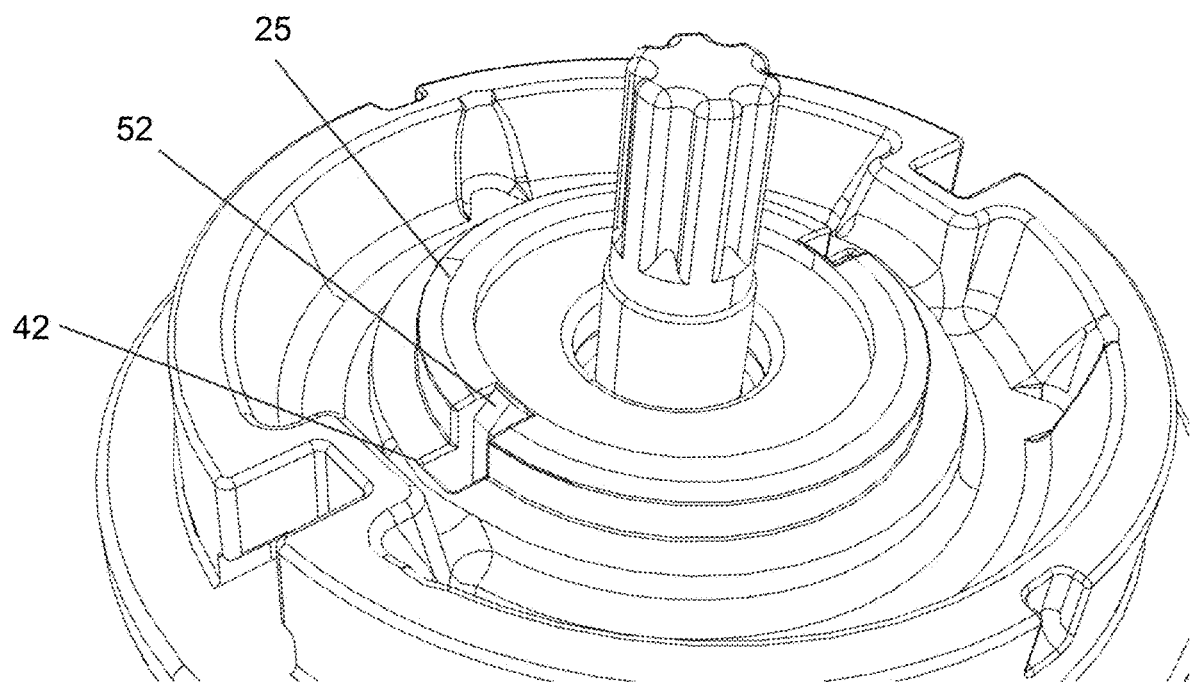
FIG. 27 is a close up view of a side view of the retractor during a released stage.

FIG. 25-27 show a side of an exemplary retractor. The shift link arms 19 are disposed on the spool 25 in a symmetrical manner. The exemplary embodiment shows two link arms diametrically opposed to each other but additional shift link arms can be disposed around the spool in a plurality of spool slots 42.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor with a staged torsion bar and shift assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seatbelt retractor for a seat belt device in a vehicle, the retractor comprising:
   a frame;
   a spool configured to be fixed to one end of a seat belt webbing so that the webbing may be wound around the spool, the spool being rotatably mounted at both ends to the frame and configured to rotate in a webbing extraction direction and a webbing retraction direction;
   a staged torsion bar configured to be selectively fixed along the length of the torsion bar in order to dampen at least two different loads, wherein the staged torsion bar is positioned in the spool parallel to an axis of rotation of the spool;
   a shift assembly configured to selectively engage the staged torsion bar
   a load nut configured to disengage from the staged torsion bar; and
   a shift link adjacent to the load nut, the shift link configured to selectively engage the load nut to the staged torsion bar.

2. The seatbelt retractor of claim 1, wherein the shift assembly further comprises:
   a shift collar surrounding the shift link, the shift collar configured to selectively lock the shift link to the spool;
   a shift ring located directly adjacent to the shift collar; and
   a shift plate located directly adjacent to the shift ring, the shift plate configured to guide the shift ring to displace the shift collar.

3. The seatbelt retractor of claim 2, wherein shift ring rotates and causes the shift ring to displace in the direction of the shift collar, and wherein the displacement of the shift ring in the direction of the shift collar causes the shift collar to unlock the shift link from the spool and allows the load nut to disengage from the staged torsion bar.

4. The seatbelt retractor of claim 2, wherein the shift assembly further includes a micro gas generator configured to move the shift ring.

5. The seatbelt retractor of claim 1, wherein the staged torsion bar includes a torsion bar spline; and
   wherein the load nut includes a load nut spline, the torsion bar spline is configured to engage the load nut spline.

6. The seatbelt retractor of claim 1, wherein the spool includes an axially extending tooth; and
   wherein the load nut includes a load nut slot, wherein the load nut is coaxial with the spool and the load nut slot engages the tooth.

7. The seatbelt retractor of claim 6, wherein the load nut slot includes a load nut slot ramp; and
   wherein the tooth includes an angled portion configured to engage the load nut slot ramp to aid the load nut to disengage the tooth and the staged torsion bar.

8. A seatbelt retractor for a seat belt device in a vehicle, the retractor comprising:
   a frame;
   a spool configured to be fixed to one end of a webbing so that the webbing may be wound around the spool, the spool being rotatably mounted at both ends to the frame and configured to rotate in a webbing extraction direction and a webbing retraction direction;
   a staged torsion bar configured to be selectively fixed along the length of the torsion bar in order to dampen at least two different loads, wherein the staged torsion bar is positioned end to end in the spool along an axis of rotation of the spool;
   a shift assembly located adjacent a first end of the frame and selectively engaged to the staged torsion bar, wherein the shift assembly is configured to selectively switch the staged torsion bar from one load stage to another load stage;
   a pretensioner located adjacent a second end of the frame, the pretensioner configured to rotate the spool in a webbing retraction direction when the pretensioner activates in response to an acceleration of the vehicle greater than a predetermined high acceleration;
   the shift assembly further includes a load nut, wherein the load nut surrounds the staged torsion bar; and
   a shift link adjacent to the load nut, the shift link configured to selectively engage the load nut to the staged torsion bar.

9. The seatbelt retractor of claim 8, wherein the staged torsion bar is unitary.

10. The seatbelt retractor of claim 8, wherein the staged torsion bar includes a torsion bar spline; and
    wherein the load nut includes a load nut spline, the torsion bar spline is configured to engage the load nut spline.

11. The seatbelt retractor of claim 8, wherein the spool includes an axially extending tooth; and
    wherein the load nut includes a load nut slot, wherein the load nut is coaxial with the spool and the load nut slot engages the tooth.

12. The seatbelt retractor of claim 11, wherein the load nut slot includes a load nut slot ramp; and
    wherein the tooth of the spool includes an angled portion configured to engage the load nut slot ramp to aid the load nut to disengage the tooth and the staged torsion bar.

13. The seatbelt retractor of claim 8, wherein the shift assembly comprises:
    a shift collar surrounding the shift link, the shift collar configured to selectively lock the shift link to the spool;
    a shift ring located directly adjacent to the shift collar; and
    a shift plate located directly adjacent to the shift ring, the shift plate configured to guide the shift ring to displace the shift collar.

14. The seatbelt retractor of claim 13, wherein shift ring rotates and causes the shift ring to displace in the direction of the shift collar, and wherein the displacement of the shift ring in the direction of the shift collar causes the shift collar to unlock the shift link from the spool and allows the load nut to disengage from the staged torsion bar.

15. The seatbelt retractor of claim 13, wherein the shift assembly further includes a micro gas generator configured to move the shift ring.

16. A seatbelt retractor for a seat belt device in a vehicle, the retractor comprising:
  a frame;
  a spool configured to be fixed to one end of a webbing so that the webbing may be wound around the spool, the spool being rotatably mounted at both ends to the frame and configured to rotate in a webbing extraction direction and a webbing retraction direction;
  a two stage torsion bar including a high load stage and a low load stage, wherein the torsion bar is configured to be selectively fixed at a point along the length of the torsion bar in order to change the length of the torsion bar subject to twisting, and wherein the two stage torsion bar is positioned end to end in the spool along an axis of rotation of the spool;
  a load nut directly connected to the two stage torsion bar, wherein the load nut is configured to selectively disengage from the two stage torsion bar along the length of the torsion bar to shift the torsion bar between the high load stage and the low load stage;
  a shift link adjacent to the load nut, the shift link includes a shift link arm configured to selectively engage the load nut to the staged torsion bar, wherein the shift link arm is radially outwards of the load nut.

17. The seatbelt retractor of claim 16, wherein the spool includes an axially extending tooth;
  wherein the load nut includes a load nut slot, wherein the load nut is coaxial with the spool and the load nut slot engages the tooth;
  wherein the load nut slot includes a load nut slot ramp; and
  the tooth includes an angled portion configured to engage the load nut slot ramp to aid the load nut to disengage the tooth and the staged torsion bar.

* * * * *